US012770216B2

(12) United States Patent
Sengar et al.

(10) Patent No.: US 12,770,216 B2
(45) Date of Patent: Oct. 20, 2026

(54) POINT CLOUD REGISTRATION

(71) Applicant: Fujitsu Limited, Kawasaki (JP)

(72) Inventors: Vartika Sengar, Bangalore (IN); Anuj Rathore, Bangalore (IN); Daksh Thapar, Bangalore (IN); Parveena Shamim Abdul Salam, Bangalore (IN); Arkadipta De, Bangalore (IN); Venkata Ujwal Sai Gujjari, Bangalore (IN)

(73) Assignee: Fujitsu Limited, Kawasaki (JP)

( * ) Notice: Subject to any disclaimer, the term of this patent is extended or adjusted under 35 U.S.C. 154(b) by 265 days.

(21) Appl. No.: 18/678,969

(22) Filed: May 30, 2024

(65) Prior Publication Data

US 2025/0252527 A1 Aug. 7, 2025

(30) Foreign Application Priority Data

Feb. 7, 2024 (IN) ............................ 202411008362

(51) Int. Cl.
*G06T 3/14* (2024.01)
*G06T 7/33* (2017.01)

(52) U.S. Cl.
CPC ................ *G06T 3/14* (2024.01); *G06T 7/337* (2017.01); *G06T 2207/10028* (2013.01); *G06T 2207/20021* (2013.01)

(58) Field of Classification Search
CPC . G06T 3/14; G06T 7/337; G06T 2207/10028; G06T 2207/20021;
(Continued)

(56) References Cited

U.S. PATENT DOCUMENTS 10,452,949 B2 * 10/2019 Jia ............................ G06T 7/30
11,037,346 B1 6/2021 Wang et al.
(Continued)

FOREIGN PATENT DOCUMENTS

CN 110738223 A 1/2020
CN 113850915 A 12/2021
(Continued)

OTHER PUBLICATIONS

Japanese Office Action issued Nov. 11, 2025 in corresponding Japanese Patent Application No. 2024-225059, 9 pages.
(Continued)

*Primary Examiner* — Phuoc Tran
(74) *Attorney, Agent, or Firm* — XSENSUS LLP

(57) ABSTRACT

A computer-implemented method comprising: determining a 2D overlapping portion between a source 2D projection of a source 3D point cloud and a target 2D projection of a target 3D point cloud, the 2D overlapping portion corresponding to an overlapping region between the source and target geographical areas; dividing the 2D overlapping portion into a plurality of cells and determining at least one overlap cell which includes at least a threshold number of points from the source 2D projection and at least a threshold number of points from the target 2D projection; performing a comparison process for said overlap cell and selecting a best matching target set; determining a transformation between the points of the source set and the points of the best matching target set or vice versa; and applying the transformation to register the source 3D point cloud to the target 3D point cloud or vice versa.

20 Claims, 14 Drawing Sheets

(58) Field of Classification Search
CPC ... G06T 2207/20072; G06T 7/35; G06T 7/90; G06T 2207/20084; G06T 2207/10024; G06T 2207/10032; G06T 2207/30252
See application file for complete search history.

(56) References Cited

U.S. PATENT DOCUMENTS

| | | | | |
|---|---|---|---|---|
| 11,423,508 | B2 * | 8/2022 | Zhang | G06T 3/147 |
| 2017/0046840 | A1 | 2/2017 | Chen et al. | |
| 2020/0043186 | A1 | 2/2020 | Selviah et al. | |
| 2020/0333466 | A1 | 10/2020 | Hansen et al. | |
| 2021/0158546 | A1 | 5/2021 | He et al. | |
| 2023/0215100 | A1 * | 7/2023 | Lee | G06T 19/00 345/419 |

FOREIGN PATENT DOCUMENTS

| | | | |
|---|---|---|---|
| CN | 114185933 | A | 3/2022 |
| CN | 114660611 | A | 6/2022 |
| CN | 115063465 | A | 9/2022 |
| JP | 2008262307 | A | 10/2008 |
| JP | 2012-063866 | A | 3/2012 |
| JP | 2013-219744 | A | 10/2013 |
| JP | 2018-106643 | A | 7/2018 |
| JP | 2021-536604 | A | 12/2021 |
| JP | 2022542289 | A | 9/2022 |
| WO | 2022/258947 | A1 | 12/2022 |
| WO | 2023/026703 | A1 | 3/2023 |

OTHER PUBLICATIONS

Masaru Shinichi, et al., "Development of Survey System Using Swing Mechanism for 3DLIDAR", 36th Annual Meeting of the Japanese Society of Robotic Engineers, Japan, Japanese Society of Robotic Engineers, Sep. 4, 2018, pp. 1-3 (partial English translation).

Japanese Office Action issued Jan. 27, 2026 in corresponding Japanese Patent Application No. 2024-225059, 9 pages.

Peter Biber, et al.,"The normal distributions transform: a new approach to laser scan matching",Proceedings 2003 IEEE/RSJ International Conference on Intelligent Robots and Systems (IROS 2003 ), United States, IEEE, Oct. 27, 2003, pp. 2743 to 2748.

Sekiguchi92,"SLAM (6) Normal Distribution Transform",Qiita , Japanese Qiita Inc.,Apr. 20, 2022, [Date of obtainment Jan. 16, 2020] <https://qiita.com/sekiguchi92/items/ab2a189225adc2359299 > (with partial English translation).

Extended European Search Report issued Oct. 14, 2024 in corresponding European Patent Application No. 24172385.7, 8 pages.

Office Action issued Sep. 10, 2024 in Japanese Patent Application No. 2024-086493 with English translation.

S. Sakakibara et al., "Range Images Registration Using Mixed Integer Linear Programming", Information Processing Society of Japan (IPSJ), Transactions on Mathematical Modeling and Its Applications, vol. 49, No. SIG 4 (TOM 20), pp. 22-35, Japan, Mar. 15, 2008. [Listed in JP Office Action of Sep. 10, 2024 as a "document indicating a well-known technique"].

Wang et al., "A Survey of Mobile Laser Scanning Applications and Key Techniques over Urban Areas", Remote Sensing, vol. 11, Issue 13, Jun. 28, 2019, pp. 1-20.

Park et al., "Framework for Automated Registration of UAV and UGV Point Clouds Using Local Features in Images", Automation in Construction, vol. 98, Feb. 2019, 28 pages.

Theiler et al., "Globally Consistent Registration of Terrestrial Laser Scans via Graph Optimization", ISPRS Journal of Photogrammetry and Remote Sensing, Oct. 27, 2015, pp. 1-35.

Ao et al., "BUFFER: Balancing Accuracy, Efficiency, and Generalizability in Point Cloud Registration", CVPR 2023, pp. 1255-1264.

Han et al., "Grid graph-based large-scale point clouds registration", International Journal of Digital Earth, vol. 16, No. 1, Jul. 2, 2023, pp. 2448-2466.

Mei et al., "Unsupervised Deep Probabilistic Approach for Partial Point Cloud Registration", CVPR 2023, pp. 13611-13620.

Shao et al., "Efficient divide-and-conquer registration of UAV and ground LiDAR point clouds through canopy shape context", pp. 1-17.

Indian Examination Report issued Aug. 19, 2026 in corresponding Indian Patent Application No. 20241108362, 10 pages.

Sheng AO, et al., "Buffer: Balancing accuracy, efficiency, and generalizability in point cloud registration", Computer Vision Foundation, Dec. 31, 2023, 10 pages.

Yi Han, et al. "Grid graph-based largescale point clouds registration", International Journal of Digital Earth, 16:1, 244-2466, DOI: 10.1080/17538947.2023.2228298, Jul. 2, 2023.

Gupfeng Mei, et al., "Unsupervised Deep Probabilistic Approach for Partial Point Cloud Registration", arXiv:2303.13290v1 [cs. CV]Mar. 23, 2023.

Jie Shao, et al., Efficient co-registration of UAV and ground LiDAR forest point clouds based on canopy shapes, International Journal of Applied Earth Observations and Geoinformation 114, Dec. 31, 2022, 11 pages.

* cited by examiner

POINT CLOUD REGISTRATION

CROSS-REFERENCE TO RELATED APPLICATION

This application is based upon and claims the benefit of priority of the prior Indian Patent Application number 202411008362, filed on Feb. 7, 2024, the entire contents of which are incorporated herein by reference.

BACKGROUND OF THE INVENTION

The present application relates to point cloud registration, and in particular to a computer-implemented method, a computer program, and an information programming apparatus.

The task of point cloud registration, also known as point cloud alignment, is the process of aligning multiple point clouds in a common coordinate system or aligning one or more point clouds with or to another point cloud. Registration may involve estimating a transformation required of one point cloud for alignment with another point cloud and applying the estimated transformation. Point cloud registration allows larger point clouds to be built from multiple smaller point clouds.

In light of the above, a point cloud registration method is desired.

SUMMARY OF THE INVENTION

According to an embodiment of a first aspect there is disclosed herein a computer-implemented method comprising: determining a 2D (2-dimensional) overlapping portion between a source 2D projection of a source 3D (3-dimensional) point cloud and a target 2D projection of a target 3D point cloud, the source and target 3D point clouds representative of source and target geographical areas, respectively, the 2D overlapping portion corresponding to an overlapping region between the source and target geographical areas; dividing the 2D overlapping portion into a plurality of cells and determining at least one overlap cell which includes at least a first threshold number of points from the source 2D projection and at least a second threshold number of points from the target 2D projection (or determining at least one cell which includes at least a first threshold number of points from the source 2D projection and at least a second threshold number of points from the target 2D projection as at least one overlap cell); performing a comparison process for said (or a said) overlap cell, the comparison process (for said/the overlap cell) comprising: determining a plurality of target sets of points comprising a first (target) set of points of the target 3D point cloud falling within said/the overlap cell (in the target 2D projection) and second and further (target) sets of points of the target 3D point cloud falling within cells neighboring/surrounding said/the overlap cell (in the target 2D projection), respectively, determining a source set of points comprising points of the 3D source point cloud that fall within said/the overlap cell (in the source 2D projection), comparing the source set with each of the plurality of target sets to determine a plurality of similarity scores for the plurality of target sets, respectively, (each similarity score quantifying similarity between the source set and a said target set,) and based on the similarity scores, selecting a best matching target set; determining a transformation (matrix) between the points of the source set and the points of the best matching target set or vice versa; and applying the transformation (matrix) (to the source 3D point cloud) to register the source 3D point cloud to the target 3D point cloud or vice versa.

According to an embodiment of a second aspect there is disclosed herein a computer-implemented method comprising: estimating a 3D (3-dimensional) overlap volume between a source 3D point cloud and a target 3D point cloud based on an overlapping region between source and target geographical areas, the source and target 3D point clouds representative of the source and target geographical areas, respectively; dividing the 3D overlap volume into a plurality of cells and determining at least one overlap cell which includes at least a first threshold number of points from the source 3D point cloud and at least a second threshold number of points from the target 3D point cloud (or determining at least one cell which includes at least a first threshold number of points from the source 3D point cloud and at least a second threshold number of points from the target 3D point cloud as at least one overlap cell); performing a comparison process for said (or a said) overlap cell, the comparison process (for said/the overlap cell) comprising: determining a plurality of target sets of points comprising a first (target) set of points of the target 3D point cloud which are in said/the overlap cell and second and further (target) sets of points of the target 3D point cloud which are in cells neighboring/surrounding said/the overlap cell, respectively, determining a source set of points comprising points of the 3D source point cloud which are in said/the overlap cell, comparing the source set with each of the plurality of target sets to determine a plurality of similarity scores for the plurality of target sets, respectively, (each similarity score quantifying similarity between the source set and a said target set,) and based on the similarity scores, selecting a best matching target set; determining a transformation (matrix) between the points of the source set and the points of the best matching target set or vice versa; and applying the transformation (matrix) (to the source 3D point cloud) to register the source 3D point cloud to the target 3D point cloud or vice versa.

Features relating to any aspect/embodiment may be applied to any other aspect/embodiment.

BRIEF DESCRIPTION OF THE DRAWINGS

Reference may be made, by way of example only, to the Figures, of which.

DETAILED DESCRIPTION

As mentioned above, the task of point cloud registration is the process of aligning multiple point clouds in a common coordinate system. A point cloud to be aligned may be referred to as a source point cloud and another point cloud (with which the source point cloud is to be brought into alignment) may be referred to as a reference or target point cloud.

Point cloud registration includes estimating a transformation required of the source point cloud for alignment with the target point cloud and applying the transformation to the source point cloud to bring it into the coordinate system of the target point cloud, i.e. into alignment with the target point cloud.

As an example application, by registering successive point cloud frames obtained from sensors such as LiDAR (Light Detection and Ranging), robots/vehicles can estimate their position and orientation accurately and move autonomously. Further applications of 3D point cloud registration include autonomous driving, 3D mapping and modelling in general, robotics, unmanned aerial vehicles, and the generation and/or real-time update of 3D maps (e.g. on edge devices).

Figure 1:
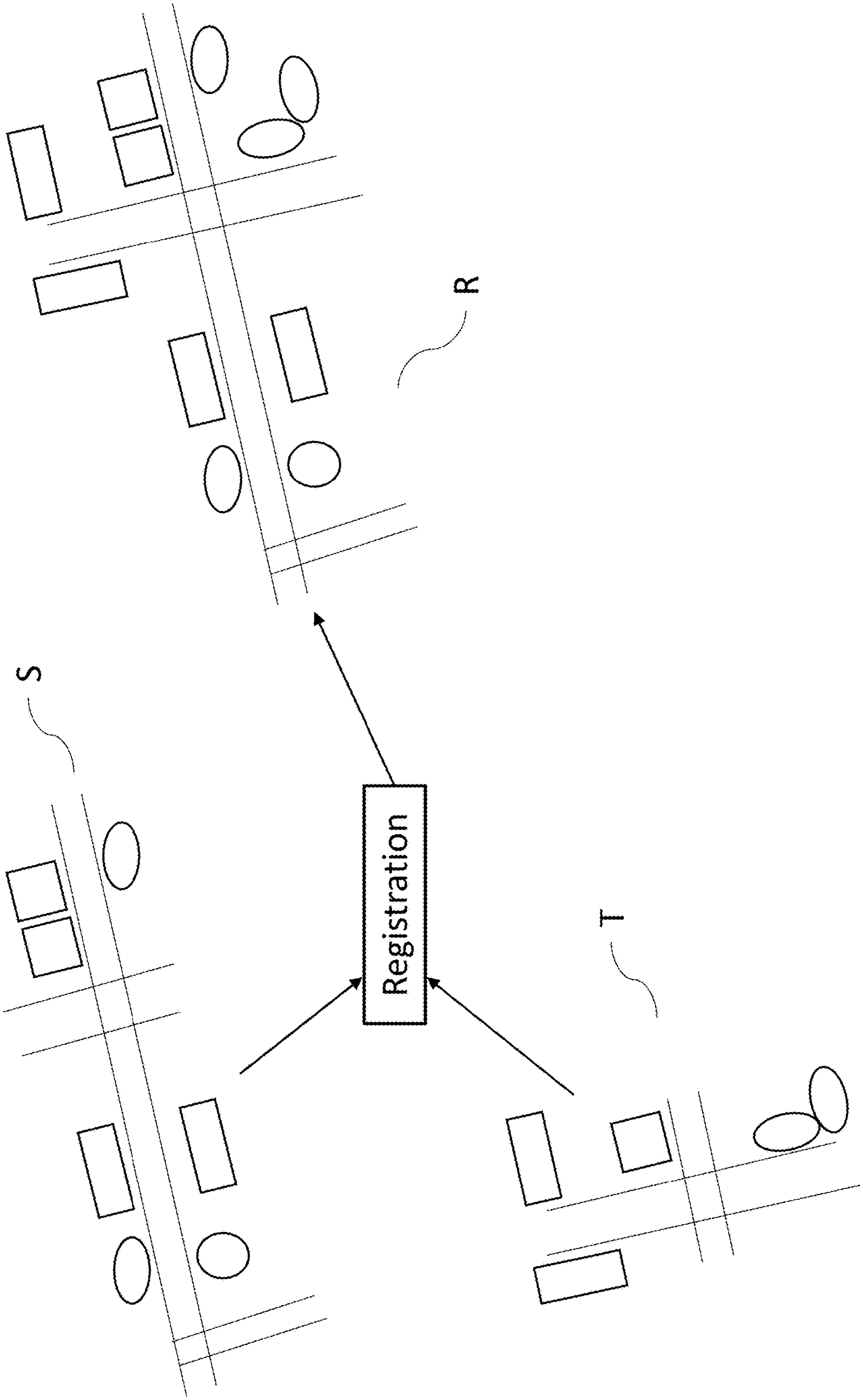
FIG. 1 is a diagram useful for understanding point cloud registration.

FIG. 1 illustrates 2D representations of points clouds S, T, and R. FIG. 1 illustrates the concept of point cloud registration in which the source point cloud S is registered with the target point cloud T to acquire the resultant point cloud R.

Figure 2:
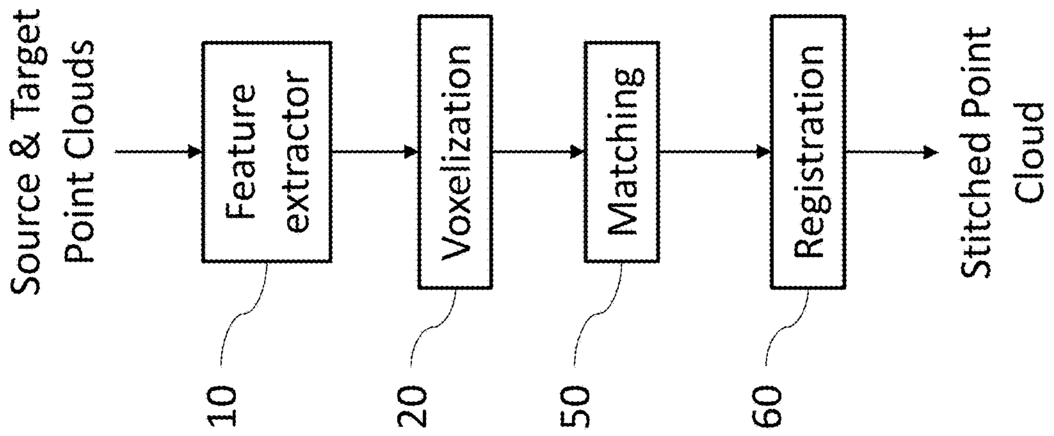
FIG. 2 is a diagram illustrating a comparative methodology.

FIG. 2 is a diagram illustrating a comparative method. The elements (labelled 10, 20, 50, and 60) may be considered method steps and/or modules for implementing operations. In the feature extractor element 10 source and target point clouds are received and features extracted therefrom. The voxelization element 20 divides the point clouds. The matching element 50 carries out matching between parts of the source point cloud and points of the target point cloud. The registration element 60 registers the source point cloud with the target point cloud based on the matching carried out by the matching step. The output of the registration step is a stitched point cloud comprising the points of the source and target point clouds. Comparative method 2 described below may be considered a more specific implementation of the general comparative method illustrated in FIG. 2.

Further comparative methods 1-4 are described below briefly to aid in understanding of the present disclosure and its context. The descriptions of the comparative methods 1-4 are only brief as they are intended merely to highlight examples of comparative techniques, e.g. the use of deep neural networks, supervised learning, and application-specific techniques.

Comparative method 1 comprises a two-stage approach. In the first stage, a point-wise feature extractor is used to extract features from each point in each point cloud (the source and target). These features are then used to build a patch-wise representation of each point cloud. In the second stage, a patch-wise registration algorithm is used to register the two point clouds.

In more detail, comparative method 1 utilizes a point-wise learner called Equivariant Fully Convolutional Network (EFCN) to predict rotation-invariant key-points and rotation-equivariant orientations. The detected key-points are then fed into a Patch-wise Embedder which is designed to learn features specific to the selected key-points. Feature matching is performed using the features generated by the Patch-wise Embedder. An Inlier Generator module is employed to search for inliers among the initial correspondences. Finally, the transformation matrix is estimated using a 3D cylindrical convolutional network (3DCCN). This transformation matrix is applied to the source point cloud to register the source point cloud with the target point cloud.

In summary, comparative method 1 focuses on learning a transformation matrix from a full point cloud using supervision on deep neural networks (DNNs)

In comparative method 2 source and target point clouds serve as input. Feature descriptors are computed for both point clouds, which are then divided into 3D grids. A two-step optimization is then used to find matching cells among the grids. First, a voting strategy is used to measure the similarity between two given cells based on feature descriptors. Second, a graph matching algorithm is used to determine corresponding points. That is, the graph matching algorithm hierarchically refines corresponding cells until point-to-point correspondences are obtained. Outliers are filtered out to identify putative correspondences. Finally, three points are randomly sampled from the putative correspondences to calculate the final transformation matrix which can be used to register the source point cloud with the target point cloud.

In summary, comparative method 2 breaks the point cloud into grids and uses complex optimization for matching the grids. As mentioned above, comparative method 2 may be considered an example of the more general comparative method illustrated in FIG. 2.

Comparative method 3 comprises learning a posterior probability distribution of Gaussian mixture models (GMMs) from source and target point clouds. This distribution is then used to predict distribution-level correspondences between the two point clouds. Comparative method 3 also uses a Sinkhorn algorithm to handle partial point cloud registration.

In more detail, comparative method 3 employs a shared weighted network to extract point-level features and overlap scores for the source and target point clouds, and a cluster head module utilizes these features to compute probability matrices, which, in turn, are used to estimate the parameters of Gaussian Mixture Models (GMMs). Subsequently, cluster-level and point-level matching modules are utilized to estimate the correspondences, facilitating the calculation of the transformation matrix, which can be used to register the source point cloud with the target point cloud. The shared weighted network is trained using local contrastive, self-consistency, and cross-consistency losses.

In summary, comparative method 3 focuses on unsupervised learning and performs processing of full point clouds.

Comparative method 4 is directed to aligning a point cloud obtained via UAV (unmanned aerial vehicle) imaging a forest-type landscape and a point cloud obtained using ground LiDAR imaging the forest-type landscape. The method comprises using a divide-and-conquer strategy to divide the registration problem into two subproblems: vertical alignment (ground alignment) and horizontal alignment (tree canopy alignment). The vertical alignment is achieved based on the ground alignment, which is achieved by finding the transformation relationship between normal vectors of the ground point clouds and the horizontal plane. The horizontal alignment is achieved by canopy projection image matching, which uses canopy shape context features to match two binary images of the projected vegetation points. The canopy alignment includes canopy point projection, canopy binary image preprocessing, canopy contour and key-points extraction, and image matching.

In summary, comparative method 4 focuses on a divide-and-conquer strategy for vertical (ground) and horizontal (tree canopy) alignment.

Figure 3:
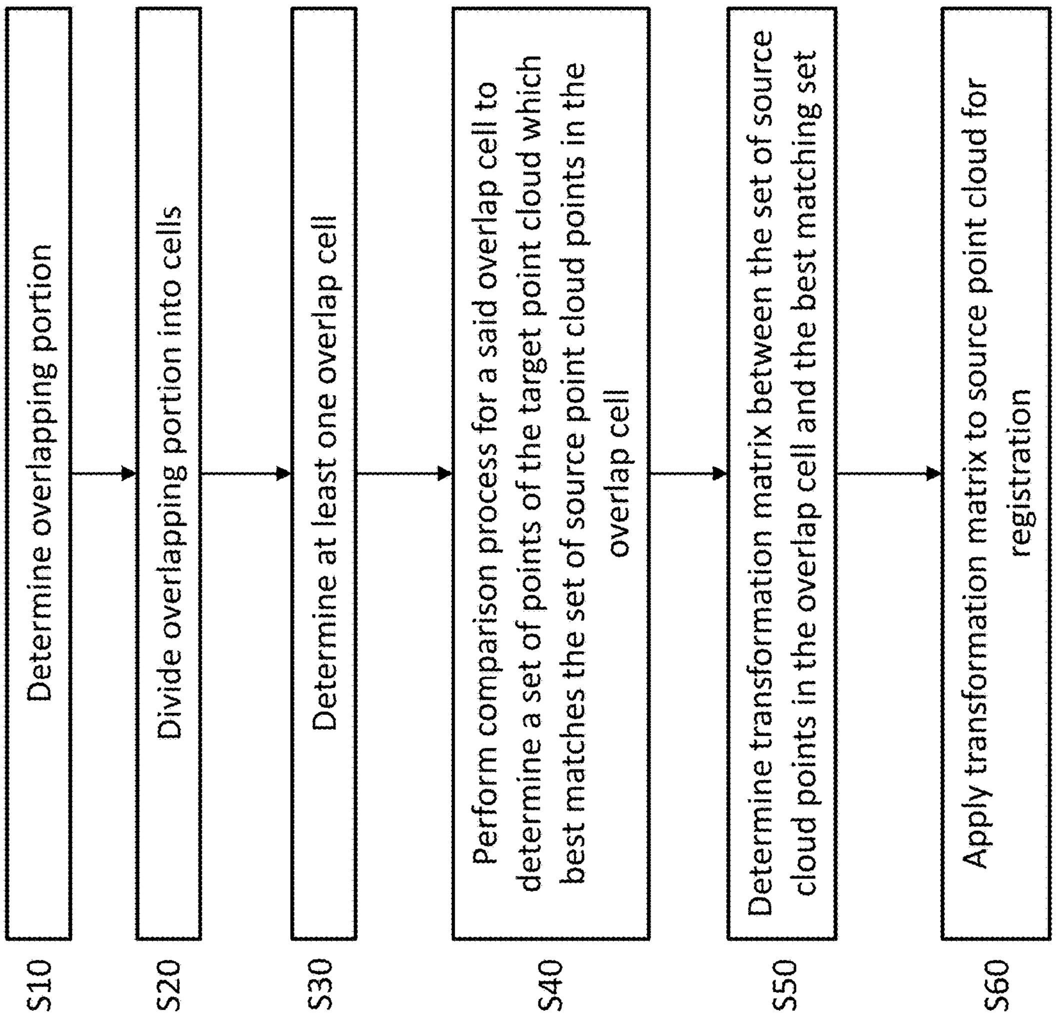
FIG. 3 is a flowchart illustrating a method.

FIG. 3 is a flow chart of a method. The method comprises steps S10, S20, S30, S40, S50, and S60. The method is for registration of a source 3D point cloud to a target 3D point cloud. The source and target 3D point clouds are representative of source and target geographical areas.

Step S10 comprises determining a 2D overlapping portion (which may be referred to as an overlapping portion) between a source 2D projection of the source 3D point cloud and a target 2D projection of the target 3D point cloud. The 2D overlapping portion corresponds to an overlapping region between the source and target geographical areas. The 3D target and source point clouds may be referred to as target and source point clouds.

The method may further comprise in a preceding step determining the source and target 2D projections of the source and target 3D point clouds. A 2D projection of a 3D point cloud may be found, for example, by setting the value of the z-coordinate for all points to zero. For example, orthogonal projection may be used to determine said 2D projections.

The 2D projections are 2D projections having been determined by "removing" the z coordinate from all points, the "z" coordinate corresponding to height and the other coordinates corresponding to the plane of the geographical areas. For example, the coordinates/dimensions of the 2D projections correspond to latitude and longitude.

Step S20 comprises dividing the overlapping portion into cells.

Step S30 comprises determining at least one "overlap cell" among the cells which includes at least a threshold number of points from the source 2D projection and at least the threshold number of points from the target 2D projection. The threshold number of points is one or two or three in some implementations of the method. For example, it may be considered that at least three points pairs in two point clouds are needed to determine a rigid transformation matrix. A different threshold number may be used for points of the source point cloud and points of the target point cloud, e.g. a first threshold number and a second threshold number.

Step S40 comprises performing a comparison process for a said overlap cell. The comparison process is carried out for a said overlap cell to determine a set of points of the target point cloud which best matches the set of source point cloud points in the overlap cell.

Step S50 comprises determining a transformation (e.g. a transformation matrix) between the set of source cloud points in the overlap cell and the best matching set of target cloud points or vice versa. Step S60 comprises applying the transformation (e.g. the transformation matrix) for registration.

In some implementations of the method, step S50 comprises determining the transformation between the set of source cloud points in the overlap cell and the best matching set of target cloud points and step S60 comprises applying the transformation to the source point cloud for registration of the source point cloud to the target point cloud. In some implementations of the method, step S50 comprises determining the transformation between the best matching set of target cloud points and the set of source cloud points in the overlap cell and step S60 comprises applying the transformation to the target point cloud for registration of the target point cloud to the source point cloud. That is, despite the convention that the source point cloud is the point cloud that is registered to the target point cloud, the transformation may be determined and/or applied the other way round. A transformation matrix may be determined for transformation between one of the point clouds and the other and its inverse may be applied to register the other point cloud to the one of the point clouds.

The comparison process of step S40 comprises:

- determining a plurality of target sets of points comprising a first set of points of the target 3D point cloud falling within the overlap cell (may be referred to as a first target set) and second and further sets of points of the target 3D point cloud falling within cells surrounding/neighboring the overlap cell (may be referred to as second and further target sets), respectively,
- determining a source set of points comprising points of the 3D source point cloud that fall within the overlap cell,
- comparing the source set with each of the plurality of target sets to determine a plurality of similarity scores for the plurality of target sets, respectively, and
- based on the similarity scores, selecting a best matching target set.

Each similarity score quantifies a similarity between the source set and the target set concerned.

When, in the above, the concept of points of a 3D point cloud falling with a particular cell is used, this refers to points in the 3D point cloud which, in the 2D projection of the 3D point cloud, fall within the particular cell. Put another way, this refers to points in the 3D point cloud whose representative points in the 2D projection of the 3D point cloud fall within the particular cell, or points in the 3D point cloud whose 2D projections fall within the particular cell.

In some implementations of the method, the cells surrounding the overlap cell used to determine the second and further target sets of points are determined by finding the Moore neighborhood of the overlap cell—that is, the said overlap cell and its surrounding cells form a Moore neighborhood with the said overlap cell as a central cell. In this case, the target sets are determined as sets of points of the target 3D point cloud falling within respective cells in a Moore neighborhood with the said overlap cell as a central cell (including the said overlap cell—this target set of points corresponds to the "first target set" referred to above).

The method may comprise determining a plurality of overlap cells and carrying out the comparison process for each overlap cell (or a plurality of the overlap cells). In such cases, step S50 comprises determining a final target set of points comprising the points of at least one of the best matching target sets and determining a final source set of points comprising the points of the corresponding at least one source set (i.e. corresponding to the at least one best matching target set), and determining the transformation matrix between the points of the final source set and the points of the final target set. The final target set may comprise points from a plurality (or the plurality) of the best matching target sets and thus the final source set may comprise the points of the plurality of corresponding source sets. The best matching target sets from which the points are taken to be added to the final target set may be selected from among the plurality of best matching sets based on their similarity score—for example, a particular number of best matching sets with the highest similarity scores may be selected, and/or any (or a number of) best matching sets above a threshold similarity score may be selected.

In some implementations, comparing the source set with each of the plurality of target sets comprises a shape comparison and/or a color comparison. The shape comparison comprises determining a source convex hull of the points of the source set and determining a plurality of target convex hulls of the points of the plurality of target sets, respectively, and comparing the source convex hull with each target convex hull. The color comparison comprises comparing the color of the points of the source set with the color of the points of the target set.

Comparing a source convex hull with a target convex hull may comprise determining a first distribution of dihedral angles of the source convex hull of the points of the source set and a second distribution of dihedral angles of the target convex hull of the points of the target set and computing a divergence (e.g. a Kullback-Leibler divergence) between the first and second distributions of dihedral angles. A contribution may then be added to the similarity score for the target set based on the computed divergence.

Comparing the color of the points of the source set with the color of the points of a said target set may comprise determining a first distribution of color intensity of the points of the source set (e.g. as a histogram of RGB or CYMK colors or other intensity) and a second distribution of color intensity of the points of the target set (e.g. as a histogram of RGB or CYMK colors or other intensity) and computing a distance measure/similarity measure (e.g. Bhattacharyya distance) between the first and second distributions. A contribution may then be added to the similarity score for the target set based on the computed distance/similarity.

Figure 4:
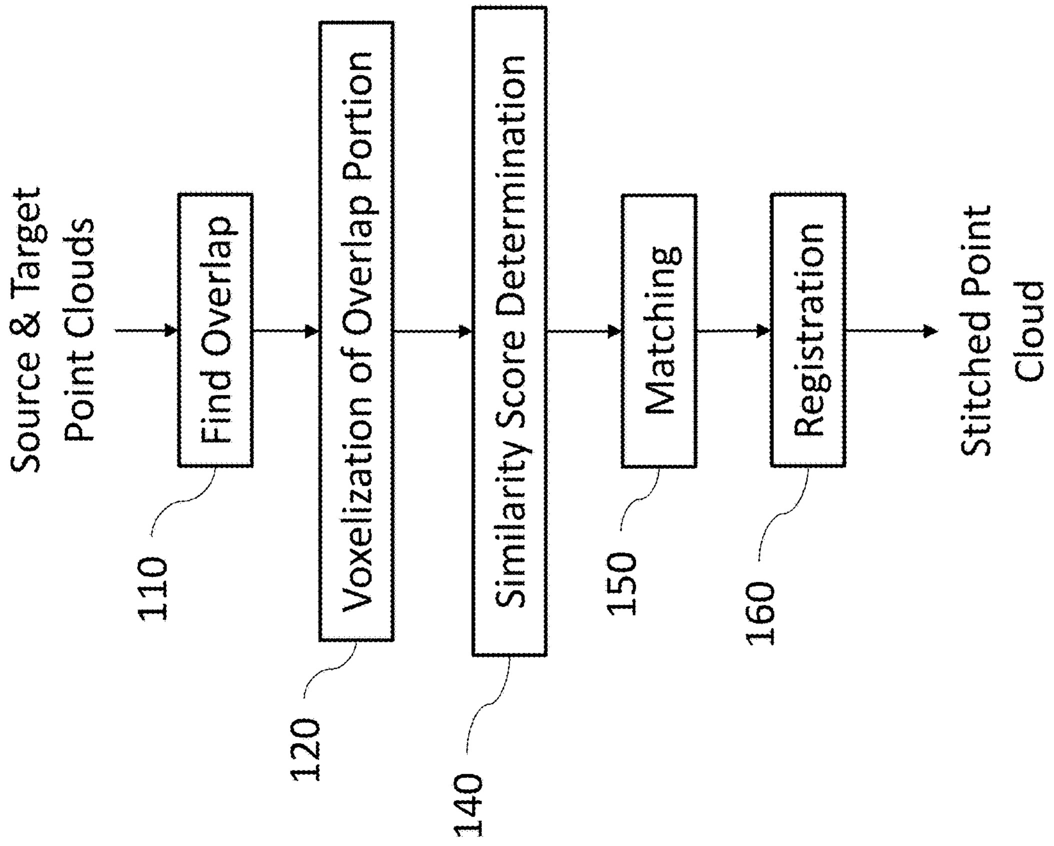
FIG. 4 is a diagram illustrating a methodology.

FIG. 4 is a diagram illustrating a methodology of the present disclosure. The elements labelled 110, 120, 140, 150, and 160 in FIG. 4 may be considered method steps or modules configured to carry out operations. Steps/operations in the FIG. 4 methodology may be considered as corresponding to method steps of FIG. 3.

The find overlap element 110 receives source and target point clouds and finds an overlap between the 2D projections thereof, and may be considered to correspond to step S10. The voxelization of overlap portion element 120 divides the overlap portion into cells and may be considered to correspond to the step S20. The similarity score determination element 140 determines overlap cells and compares, for each overlap cell, the set of points of the source point cloud falling within the overlap cell with sets of points of the target point cloud falling within cells of a Moore neighborhood with the overlap cell as the central cell, respectively, to determine similarity scores corresponding to the target sets of points, respectively (and corresponding to the Moore neighborhood cells, respectively).

The matching element 150 determines for each overlap cell the cell of the corresponding Moore neighborhood with the highest similarity score. The elements 140 and 150 together may be considered to correspond to the steps S30 and S40 together. The registration element determines a transformation between points of the source point cloud and points of the target point cloud which fall within the overlap cells and the best matching cells, respectively, and applies the transformation to the source point cloud to register the source point cloud with the target point cloud. The registration element 160 may be considered to correspond to the steps S50 and S60. A stitched point cloud is output from the registration element 160 comprising the source and target point clouds.

Figure 5:
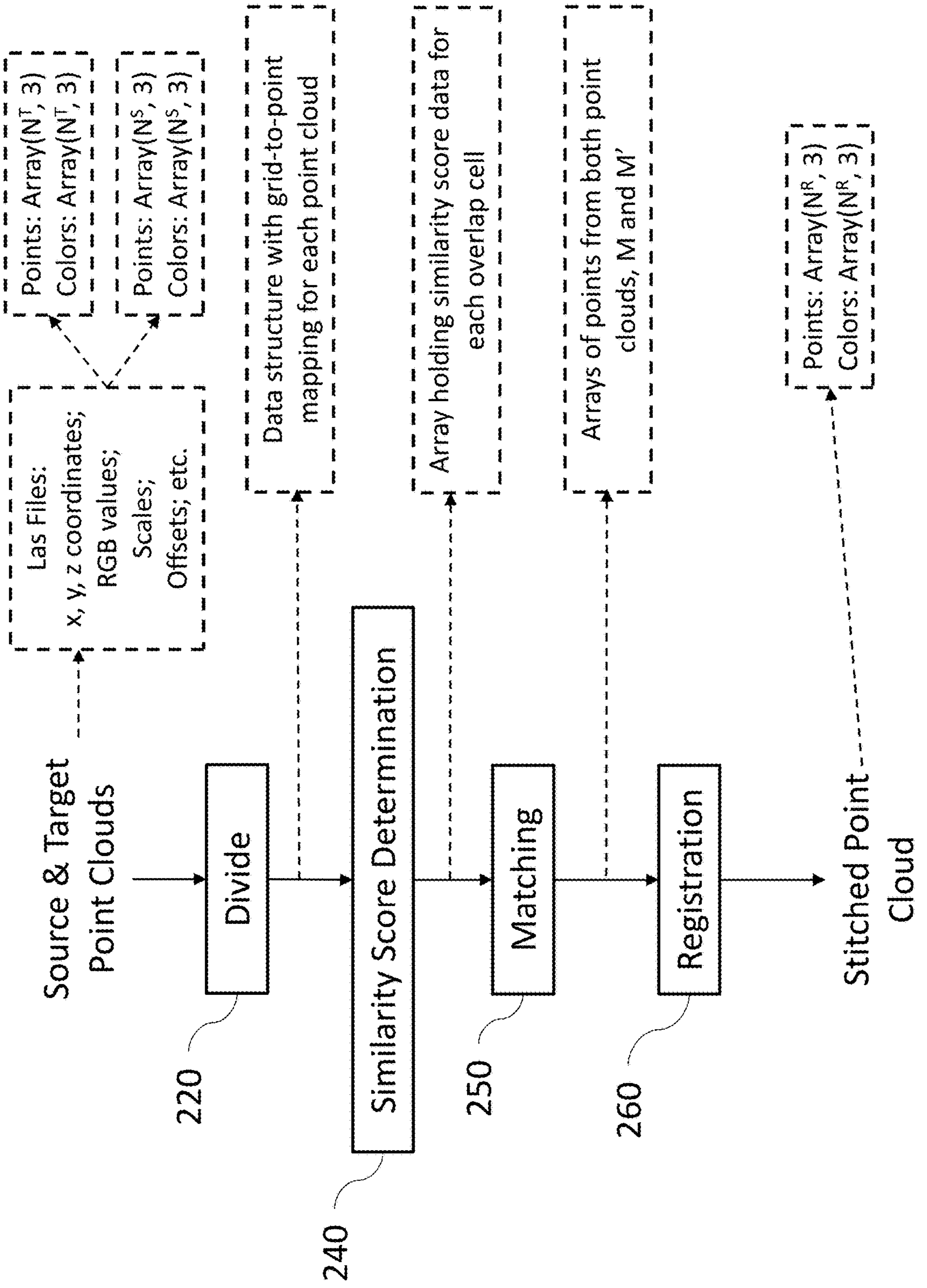
FIG. 5 is a diagram illustrating a methodology.

FIG. 5 is another diagram illustrating a methodology of the present disclosure. The elements labelled 220, 240, 250, and 260 in FIG. 5 may be considered method steps or modules configured to carry out operations. It will be appreciated that FIG. 5 is similar to FIG. 4, the differences being that FIG. 5 comprises dashed-line boxes with further information which will be described below and that FIG. 5 includes a divide element 220 rather than the elements 110 and 120 in FIG. 4. Furthermore, the remaining elements in FIG. 5 have similar reference signs to the elements 140, 150, and 160 in FIG. 4, and description of these elements is omitted for brevity.

The further information illustrated in FIG. 5 by the dashed-line boxes represents how the data at particular steps may be stored according to some implementations. The source and target point clouds may be stored as LAS files. The LAS (LASer) format is a file format designed for the interchange and archiving of lidar point cloud data. For example, the data of the point clouds may comprise x, y, z coordinates; RGB values; Scales; Offsets; etc. The arrays of points and colors for each point cloud (Points: Array ($N^T$, 3) & Colors: Array ($N^T$, 3) for the target point cloud and Points: Array ($N^S$, 3) & Colors: Array ($N^S$, 3) for the source point cloud) may be extracted/built from the LAS data and used in the subsequent stage. Instead of the input being the LAS data, the input may be in the format of the arrays.

After the divide step 220 (which includes determining an overlap portion between the 2D projections and dividing the overlap portion, as described e.g., for the elements 110 and 120 in FIG. 4), the output is in the form of a data structure with a grid-to-point mapping for each point cloud. For example, a list for "points" and a list for "colors", the length of both being the number of cells the overlap portion has been divided into (#cells). Each element of a said list comprises an array of size ($n^j$, 3), where j=S, T (S denotes a point of the source point cloud and T denotes a point of the target point cloud). That is, overall the lists are the form of arrays of size ($n_i^j$, 3) where i=1 to #cells.

The determination of overlap cells (e.g. containing at least one point from the source point cloud and at least one point from the target point cloud) may take place in the divide element 220 or the similarity score determination element 240. The condition for determining a set of overlap cells C may be represented as $C=\{k: n_k^S>0 \ \& \ n_k^T>0\}$.

The output of the similarity score determination element 240 in this implementation is an array holding similarity score data for each overlap cell. For example, assuming there are K overlap cells, the array is of size (K, 2). For example, ($cell_k$, 1)=maximum matching score for the overlap cell k, and ($cell_k$, 2)=index of the best matching Moore neighborhood cell for the overlap cell k.

The output of the matching element 250 in this implementation is arrays of points from both point clouds. That is, points of the source point cloud falling within an overlap cell are added to an array M and points of the target point cloud falling within a corresponding best matching cell are added to an array M'. Points may be added for all overlap cells or a subset with a similarity score above a threshold or selected another way as previously described. The arrays may be of the following sizes, where $P^S$ and $P^T$ are the numbers of source point cloud points and target point cloud points added to the respective arrays M and M'.

M=Array ($P^S$, 3)

M'=Array ($P^T$, 3), where $P^S \ll N^S$ and $P^T \ll N^T$. That is, the numbers of points in the arrays M and M' are generally able to be much lower than the total numbers of points in the point clouds.

The output of the registration element 260 is the stitched point cloud and may be in the form of arrays for the points' positions and colors, similarly to the input described above, i.e. Points: Array ($N^R$, 3) and Colors: Array ($N^R$, 3), where the index R denotes the stitched point cloud.

Figure 6:
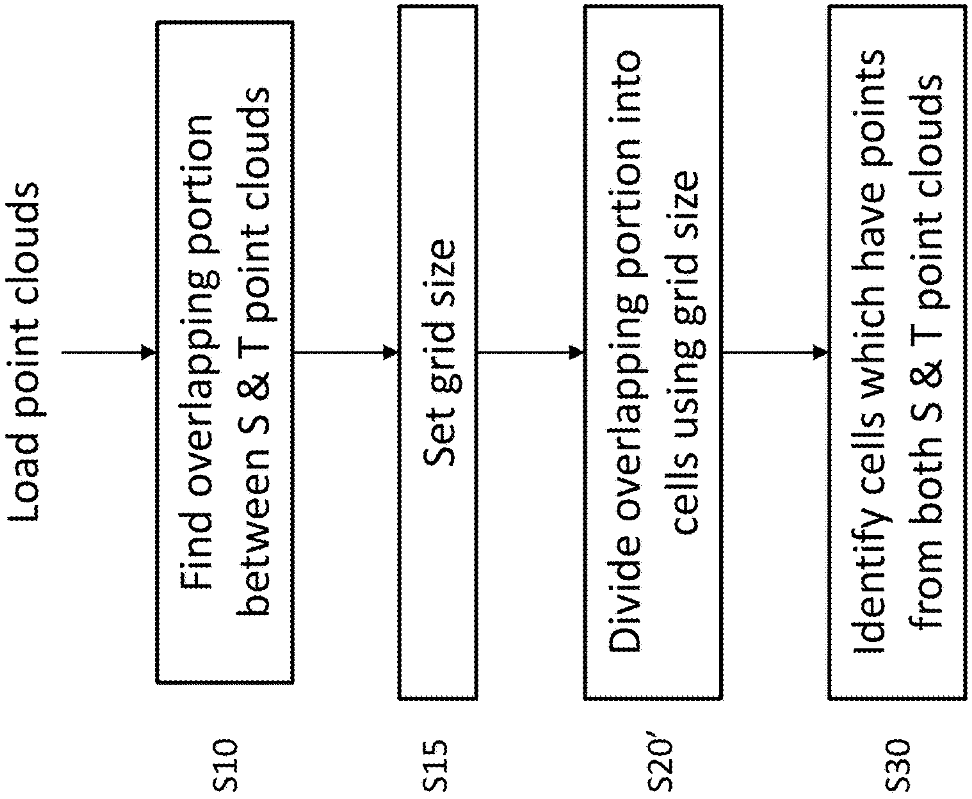
FIG. 6 is a flowchart illustrating a method.

FIG. 6 is a flow chart illustrating an implementation of how to divide the overlapping portion in cells. The method illustrated in FIG. 6 comprises steps S10, S15, S20', and S30. The steps S10 and S30 are the same as the steps of the same labels in FIG. 3 and are included here for context, and duplicate description is omitted. Step S20' corresponds to step S20 in FIG. 3, but here the division into cells is based on the grid size (which is not necessarily the case in the step S20, but may be). Step S15 comprises setting a grid size. The grid size is then used in the step S20' to divide the overlapping portion into cells—that is, step S20' comprises dividing the overlap portion into uniform 2D orthogonal cells of size grid_size. The method of FIG. 6 may be adopted in the method of FIG. 3 or any other method/methodology described herein to divide the overlapping portion into cells.

The grid size is set such that the area of a resulting cell is greater than the total number of points in the overlap portion divided by the area of the overlap portion. The grid size may be chosen with an average number of points per cell in mind. For example, the desired average number of points per cell may be used to determine the total number of cells and the grid size may be determined based on that number. Alternatively, the desired average number of points per cell may be used to determine an area of each cell and the grid size may be determined based on that area.

Figure 7:
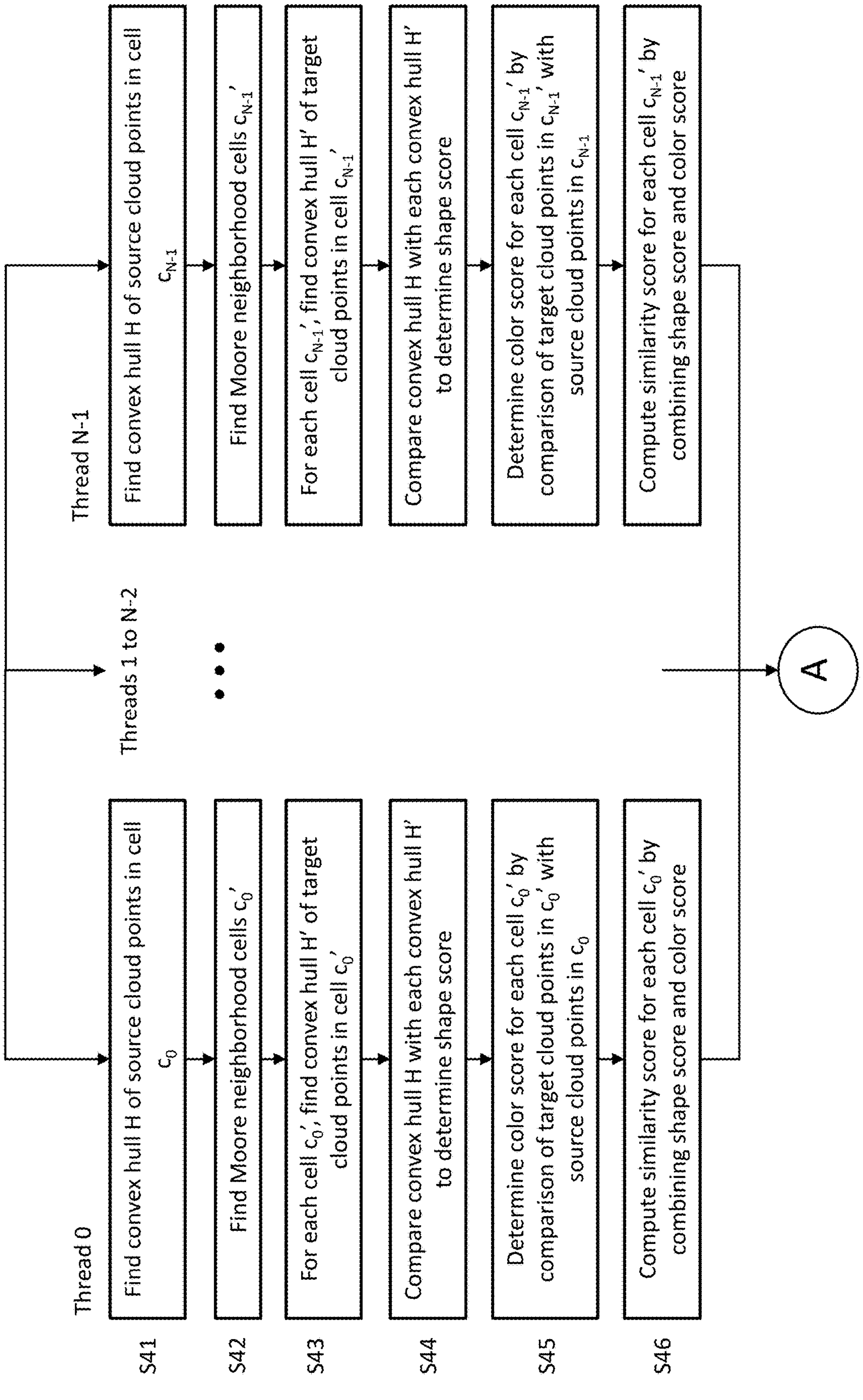
FIG. 7 is a flowchart illustrating a method.

FIG. 7 is a flow chart illustrating a comparison process in a specific implementation of the step S40 (or any similarity score determination step/element described herein). That is, the method illustrated in FIG. 7 may be adopted in the step S40.

The FIG. 7 method comprises multiple threads 0 to N−1, where N is the number of overlap cells. That is, each thread corresponds to a comparison for a given overlap cell.

Thread 0 comprises steps S41-S46. The other threads also comprise these steps but for different overlap cells. Thread 0 comprises processing carried out for the overlap cell $c_0$ (specifically, the source cloud points thereof) and each corresponding Moore neighborhood cell $c_0'$ (specifically, the target cloud points thereof, Moore neighborhood cells including the overlap cell as a central cell in the Moore neighborhood), and thread N−1 comprises processing carried out for the overlap cell $c_{N-1}$ and each corresponding Moore neighborhood cell $c_{N-1}'$. The steps will be described using the reference c for the overlap cell and c' for each Moore neighborhood cell, for simplicity.

Step S41 comprises finding the convex hull H of source cloud points in the overlap cell c. Step S42 comprises finding the Moore neighborhood cells c' of the overlap cell c (which will include the overlap cell as the central cell of the Moore neighborhood). Step S43 comprises finding, for each Moore neighborhood cell c', the convex hull H' of target cloud points in the Moore neighborhood cell c'. Step S44 comprises comparing the convex hull H with each convex hull H' to determine a shape score for each Moore neighborhood cell c'.

Step S45 comprises determining a color score for each Moore neighborhood cell c' by comparison of the color of the target cloud points in the Moore neighborhood cell c' with the color of the source cloud points in the overlap cell c. The color score may be determined instead by comparing intensities (e.g. LiDAR intensities) rather than colors, specifically, and may be referred to as an intensity score.

Step S46 comprises computing a similarity score for each Moore neighborhood cell by combining the shape score and the color score. The combination may comprise a summation. The shape score and the color score may be weighted in the summation.

In the above description, the wording "source cloud points in the overlap cell", for example, means points in the source point cloud whose 2D projection is within the overlap cell, or points in the source point cloud corresponding to points in the 2D projection of the source point cloud falling within the overlap cell. Similar description applies to similar wording (e.g. relating to the Moore neighborhood cells and the target point cloud).

It will be appreciated that there are similarities between the steps S41-S46 and the description of possible implementations of the step S40 described with reference to FIG. 3. Features may be interchanged between the FIG. 7 description and the step S40 description. For example, a Kullback-Liebler divergence may be computed as part of the step S44, and/or histograms may be used in the step S45.

Figure 8:
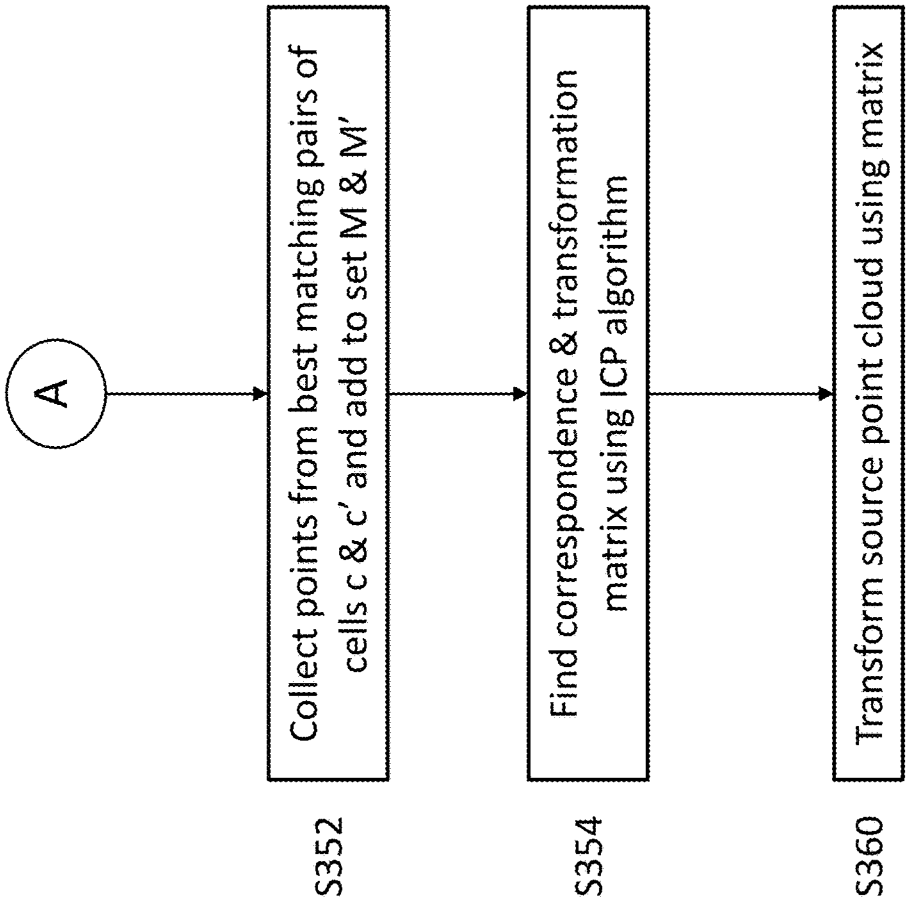
FIG. 8 is a flowchart illustrating a method.

FIG. 8 is a flow chart illustrating an implementation of the steps S50 and S60 in FIG. 3 and comprises steps S352, S354 and S360.

Step S352 comprises collecting points from best matching pairs of cells c and c' and adding them to the sets M and M', respectively. That is, following a comparison for an overlap cell c, the points in the source point cloud falling within the overlap cell c are added to the set M and the points of the target point cloud falling within the best matching Moore neighborhood cell c' are added to the set M'. This is done for all overlap cells or a subset whose similarity scores with the corresponding best matching cells are above a threshold (or the subset may be selected in another way as described above).

Step S354 comprises finding a correspondence and transformation matrix (or, more simply put, finding a transformation matrix) between the sets M and M' using the ICP (iterative closest point) algorithm. Step S360 comprises transforming the source point cloud using the transformation matrix.

As indicated by the reference "A" in FIGS. 7 and 8, the method in FIG. 8 may be a continuation of the method in FIG. 7, but this is not essential.

Figure 9:
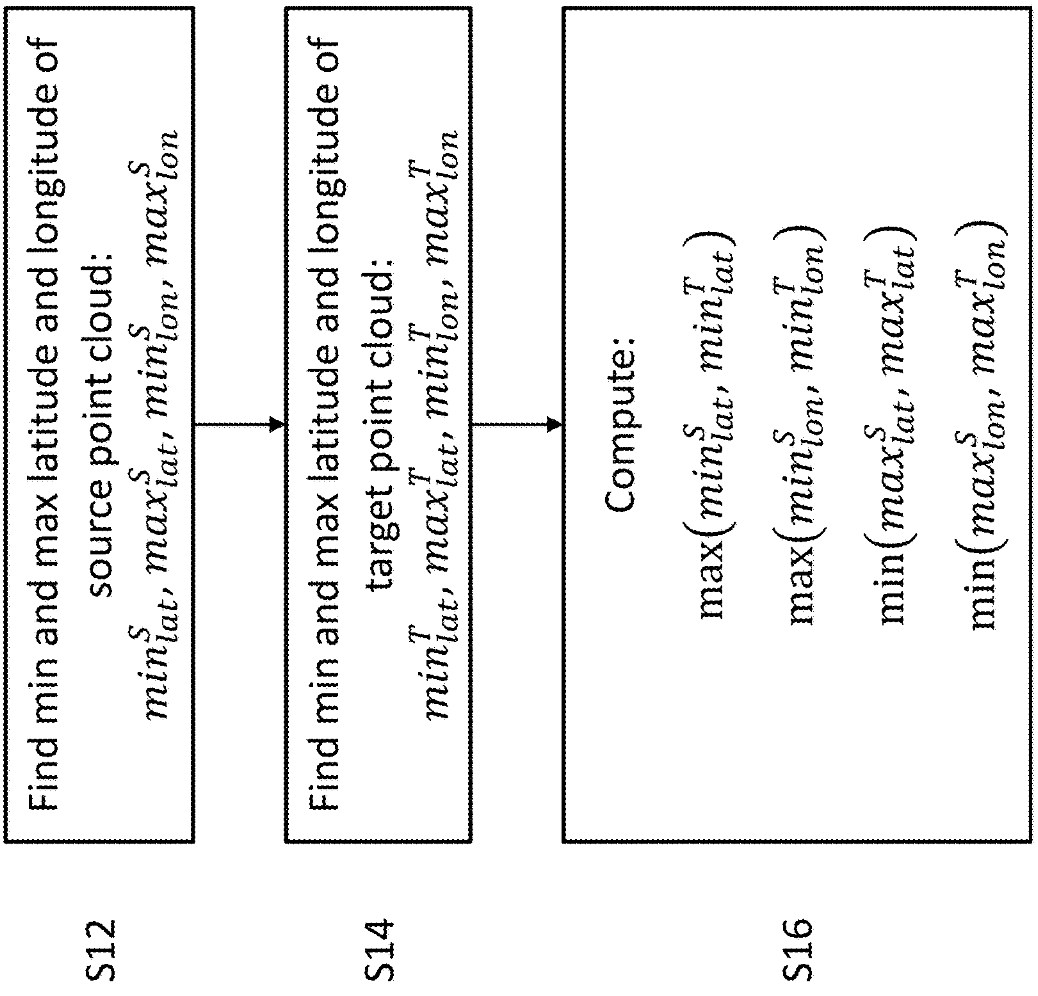
FIG. 9 is a flowchart illustrating a method.

FIG. 9 is a flow chart illustrating an implementation of the step S10, comprising steps S12, S14, and S16. The implementation illustrated here is not essential. Step S12 comprises finding the minimum and maximum latitude and longitude of the source point cloud. For example, the source 2D projection may be used in this step. The minimum and maximum latitude and longitude of the source point cloud are denoted $\min^S_{lat}$, $\max^S_{lat}$, $\min^S_{lon}$, and $\max^S_{lon}$.

Step S14 comprises finding the minimum and maximum latitude and longitude of the target point cloud. For example, the target 2D projection may be used in this step. The minimum and maximum latitude and longitude of the target point cloud are denoted $\min^T_{lat}$, $\max^T_{lat}$, $\min^T_{lon}$, and $\max^T_{lon}$.

Step S16 comprises finding the maximum and the minimum among the following pairs of values determined in steps S12 and S14:

$\max(\min^S_{lat}, \min^T_{lat})$ $\max(\min^S_{lon}, \min^T_{lon})$ $\min(\max^S_{lat}, \max^T_{lat})$ $\min(\max^S_{lon}, \max^T_{lon})$.

That is, step S16 comprises finding the maximum of the pair of values comprising the minimum latitude of the source point cloud and the minimum latitude of the target point cloud, the maximum of the pair of values comprising the minimum longitude of the source point cloud and the minimum longitude of the target point cloud, the minimum of the pair of values comprising the maximum latitude of the source point cloud and the maximum latitude of the target point cloud, and the minimum of the pair of values comprising the maximum longitude of the source point cloud and the maximum longitude of the target point cloud.

The values determined in step S16 correspond to boundaries of the overlap portion. It is noted that the overlap portion is an estimate of the overlap between the 2D representations. As described above, overlap cells are determined as cells comprising at least a threshold number of points of the source point cloud and at least the threshold number of points of the target point cloud.

Figure 10:
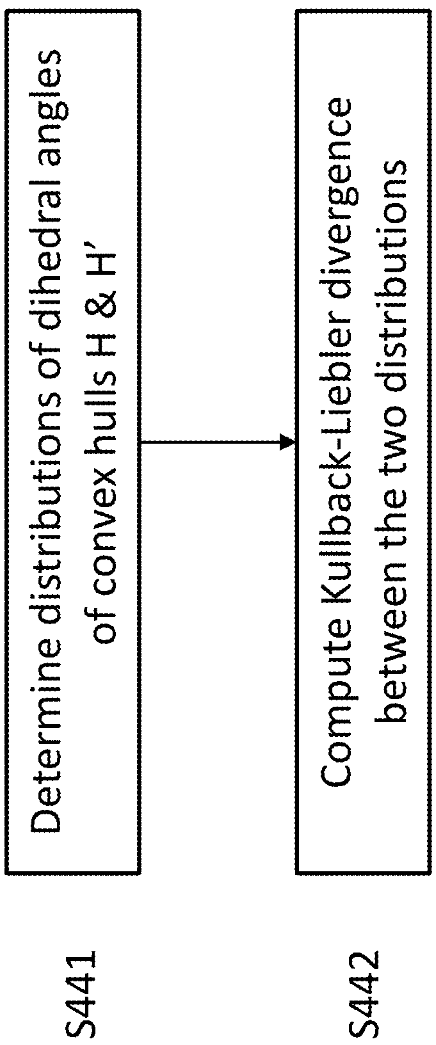
FIG. 10 is a flowchart illustrating a method.

FIG. 10 is a flow chart illustrating an implementation of the step S44 in FIG. 7 for a given overlap cell and a given Moore neighborhood cell, comprising steps S441 and S442. The implementation illustrated here is not essential. Step S441 comprises determining a distribution of dihedral angles of the convex hull H of the points of the source point cloud whose 2D projection fall within the overlap cell and a distribution of dihedral angles of the convex hull H' of the points of the target point cloud whose 2D projection fall within the given Moore neighborhood cell. Step S442 comprises computing the Kullback-Liebler divergence between the two distributions. The Kullback-Liebler divergence is then used to compute a shape score (and may be the shape score).

Figure 11:
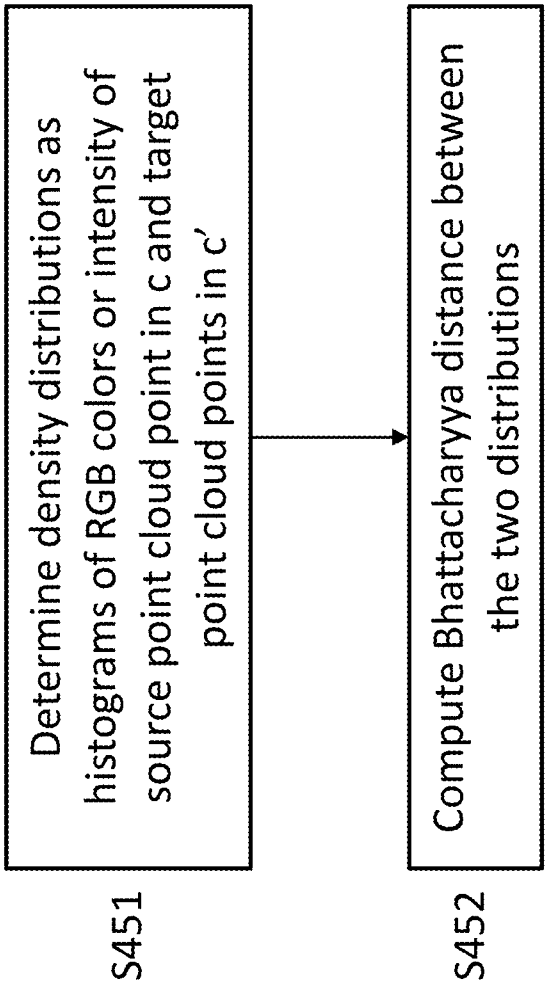
FIG. 11 is a flowchart illustrating a method.

FIG. 11 is a flow chart illustrating an implementation of the step S45 in FIG. 7 for a given overlap cell and a given Moore neighborhood cell, comprising steps S451 and S452. The implementation illustrated here is not essential. Step S451 comprises determining a density distribution as a histogram of the RGB (or CYMK) colors or color intensity of the source point cloud points in the overlap cell c, and determining a density distribution as a histogram of the RGB (or CYMK) colors or color intensity of the target point cloud points in the Moore neighborhood cell c'. That is, this step comprises determining a histogram for the colors of points in the source point cloud corresponding to the overlap cell c by binning the data values (color intensities) into contiguous class intervals and normalizing the histogram (which provides the probability distribution of the values (color intensities)). The same is done for the points in the target point cloud corresponding to the given Moore neighborhood cell c'. Intensity (e.g. LiDAR intensity) may be used instead of color intensity specifically. Color intensity comprises the intensity in given color channels (e.g. RGB or CYMK).

Step S452 comprises computing the Bhattacharyya distance between the two distributions. The Bhattacharyya distance is then used to compute a color score (and may be the color score). To find the Bhattacharyya distance, first the Bhattacharyya coefficient BC is determined by the following equation:

$$BC(H_1, H_2) = \sum_{k=1}^{n} \sqrt{H_{1k} H_{2k}}$$

where $H_1$ and $H_2$ are the two normalized histograms and $H_{1k}$ and $H_{2k}$ are the kth bin values out of a total of n bins. The Bhattacharyya distance BD is then computed by the equation:

$$BD = -\ln(BC).$$

Figure 12:
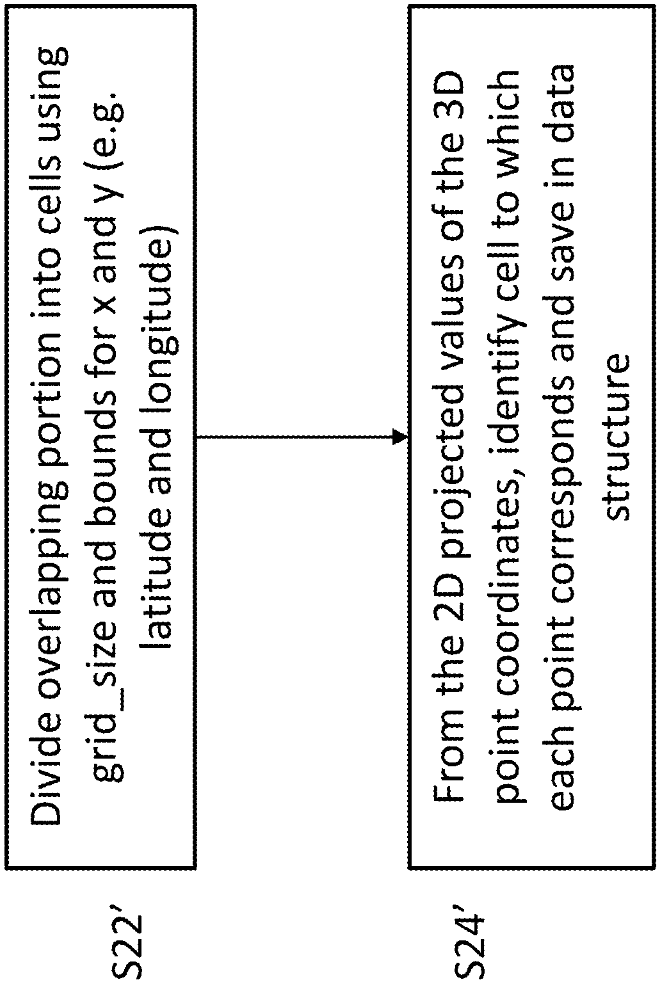
FIG. 12 is a flowchart illustrating a method.

FIG. 12 is a flow chart illustrating an implementation of the step S20' in FIG. 6 for an overlap portion. The implementation illustrated here may be comprised in step S20' and/or other corresponding steps/elements but is not essential.

Step S22' comprises dividing the overlapping portion into cells using the grid size (grid_size -which may be determined in advance as described elsewhere) and the bounds of the overlap portion for the x and y coordinates (e.g. latitude and longitude). The 2D overlap portion is divided into 2D rectangular (e.g. square) cells. The number of cells #cells=$\max^x_{ind} \times \max^y_{ind}$, where $\max^x_{ind}$ is the maximum value of the index for the x coordinate and $\max^y_{ind}$ is the maximum value of the index for the y coordinate, where these indices are for labelling the cells (and the points corresponding thereto), e.g. as a cell $C_{xy}$.

Step S24' comprises identifying the cell to which each point in the overlap portion corresponds/belongs. That is, this step comprises identifying the cell to which each point falls in the 2D projection thereof. Each point of the overlap portion is saved into a data structure and for example labelled with the corresponding cell, for use in later steps.

There is disclosed herein a method as described below. It will be appreciated that the method described below shares similarities with methods/methodologies described above and features may be shared between them. The method described below may considered a specific implementation of the method of e.g. FIG. 3.

An objective of the method is to solve a problem of handling large point clouds in point cloud registration and for faster runtime. An approach inspired by the Divide and Conquer strategy is proposed. An objective of the proposed approach is to align a source point cloud with respect to a target point cloud. In the case of multiple source point clouds to be aligned, after alignment to the target point cloud, the source point clouds can all be stitched together, for example, to get a 3D global map of an area.

1. INPUT. A point cloud, identified as a target point cloud and another point cloud, identified as source point cloud, are input.

DIVIDE—This step comprises two steps—Overlap and Voxelization.

2. In the overlap step, the bounds for the overlapping region of the source and target point clouds in 2D are determined using GPS data-(x_min,y_min) and (x_max,y_max), in which x and y may be considered latitude and longitude.
3. In the voxelization step the overlapping area is divided into uniform orthogonal 2D cells of size grid_size*grid_size. The cells are identified by their cell indices and grid_size is determined as a function of the number of points within the bounds and the bound values themselves. Owing to the approximate nature of the determination of the overlap area/portion, each of these cells can have either zero number of points or multiple points from either or both point clouds. The set of cells “C” (comprising cells c) which have overlap (that is, they have points from both the point clouds) are considered as overlap cells. For example, overlap cells may be determined as cells comprising at least a threshold number of points of the source point cloud and at least the threshold number of points of the target point cloud, and the threshold number of points may be 1.

SIMILARITY SCORE DETERMINATION

4. To find the candidate points for correspondence between the source and target point clouds the overlapping cells c in the set C are considered. For each cell c in C, the cells in the Moore neighbourhood (in 2D) with the cell c as the central cell are determined. These cells are denoted as cells c' of the set C', for a given overlap cell c. The set C' for an overlap cell c also includes the central cell c (but the points of the target point cloud are considered for the Moore neighborhood cells c' in C' and the points of the source point cloud are considered for the overlap cell(s) c in C).

5. For a given overlap cell c, the convex hull H of the points of the source point cloud whose 2D projection lie in cell c is determined. For each cell c' corresponding to the overlap cell c, the convex hull H' of the points of the target point cloud whose 2D projection lie in cell c' is determined. For the convex hull determination/evaluation, a subsampling of the points is chosen via a farthest point sampling method, such that shape information of the point cloud is retained. The subsampling is not essential but helps to reduce computational time. The convex hull may be determined via any suitable algorithm for determining convex hulls (e.g. Graham scan, Monotone chain, Incremental convex hull algorithm, etc.). For each cell c', a shape similarity score (or shape score) is determined based on comparing the convex hull H with the convex hulls H'. This convex hull determination and comparison is performed for each overlap cell c in C. The result is, for each overlap cell c, a plurality of shape scores corresponding to the Moore neighborhood cells c' in C' for that overlap cell c.
6. For each overlap cell c, a plurality of color similarity scores (or color scores) are determined corresponding to the Moore neighborhood cells c' for that overlap cell c. That is, the color score for a given cell c' is computed by comparing points of the target point cloud whose 2D projection is within the cell c' with points of the source point cloud whose 2D projection is within the overlap cell c corresponding to the cell c'. The comparison comprises comparing the color intensity (e.g. RBG or CYMK), for example using a histogram-based measure.

CONQUER

7. The candidate cell c' with the best "net matching score" (a combination of the shape and color scores, e.g. defined as a linear combination of the two similarity scores) is chosen as the best matching cell for the given cell c. A best matching cell c' is chosen for each overlap cell c. The set of points from the source and target point clouds for each matching pair of cells c and c', respectively, are appended to the sets M and M', respectively. That is, the set M comprises points from the source point cloud whose 2D projections fall within the overlap cells c of the set C, and the set M' comprises points from the target point cloud whose 2D projections fall within the best matching cells c' corresponding to the overlap cells c.

A threshold is applied for the net matching score so that not necessarily all pairs of cells c, c' are selected for inclusion in the sets M and M'—i.e. so that only "good" matches (and the corresponding points) are considered for registration. A transformation matrix is learned, for example using a suitable registration algorithm, between the sets M and M'. It is noted that instead of loading the entire point cloud for computation of the transformation matrix (e.g. in a device memory), only the points of the sets M and M' are needed to be loaded for the computation.

8. Once the Transformation matrix is obtained (point 7 above) this is applied to the entire source point cloud. The resultant point cloud points $P_{new}$ may be defined as follows: $P_{new}$=P1 (unique)+P1 (correspondences)+P2 (unique), where P1 and P2 are the points of the target and source point clouds, respectively, and more specifically P1 (correspondences) refers to points in target point cloud which are matched with points in source point cloud (i.e. these points are present in, and represent the same physical location in, both point clouds), whilst P1 (unique) and P2 (unique) are the remaining points in the target and source point clouds respectively which do not have corresponding matching points. In this way the redundant points are not included. In case there is some occlusion or missing points in the target point cloud but not in the source point cloud (or vice versa) then these points may be included in the resultant point cloud due to the points P2 (unique), for example.

The shape and/or color score may be determined as described with reference to other methods and Figures disclosed herein.

The implementations and examples described above may be considered a first group of implementations. A second group of implementations is also disclosed herein. The implementations of the second group are the same as those of the first group except that a 3D overlap volume is determined and divided into 3D cells rather than a 2D overlapping portion being divided into 2D cells and, furthermore, in the implementations of the second group, the source and target sets corresponding to a said (3D) overlap cell are determined differently from the sets of points corresponding to a (2D) overlap cell in the first group of implementations (but the comparison between the sets is the same). That is, in the comparison process in the second group of implementations the source and target sets of points are determined as sets of points of the point cloud concerned which are in a 3D cell concerned, rather than points which fall within 2D cells in a 2D projection. Otherwise, the implementations of the second group are the same as that of the first group and duplicate description is omitted.

Figure 13:
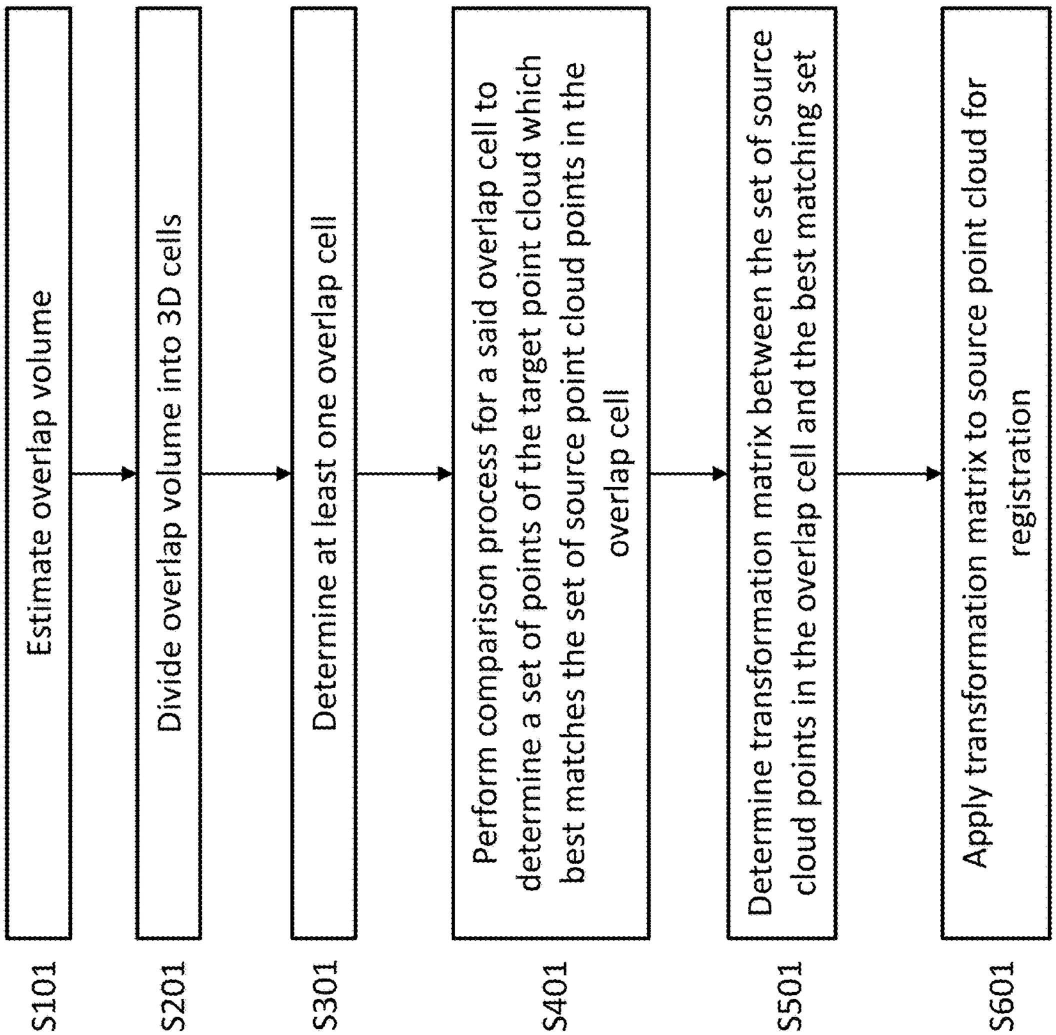
FIG. 13 is a flowchart illustrating a method.

For example, FIG. 13 is a flowchart illustrating a method according to an implementation of the second group. The method comprises steps S101-S601. Similarities with the method of FIG. 3 comprising steps S10-S60 will be appreciated.

Step S101 comprises estimating an overlap volume. That is, this step comprises estimating a 3D overlap volume between a source 3D point cloud and a target 3D point cloud based on an overlapping region between source and target geographical areas, the source and target 3D point clouds representative of the source and target geographical areas.

Step S201 comprises dividing the 3D overlap volume into a plurality of 3D cells.

Step S301 comprises determining at least one overlap cell. That is, this step comprises determining at least one overlap cell which includes at least a threshold number of points from the source 3D point cloud and at least the threshold number of points from the target 3D point cloud. It will be appreciated that the overlap cell is a 3D cell. The threshold is the same as the threshold in step S30 and may e.g. be 1 or 2 or 3 (or a different number).

Step S401 comprises performing a comparison process for a said overlap cell to determine a set of points of the target point cloud which best matches the set of source point cloud points in the overlap cell. That is, this step comprises performing a comparison process for a said overlap cell, the comparison process comprising:

determining a plurality of target sets of points comprising a first target set of points of the target 3D point cloud which are in the overlap cell and second and further target sets of points of the target 3D point cloud which are in cells neighboring/surrounding the overlap cell, respectively, determining a source set of points comprising points of the 3D source point cloud which are in the overlap cell, comparing the source set with each of the plurality of target sets to determine a plurality of similarity scores for the plurality of target sets, respectively, and based on the similarity scores, selecting a best matching target set.

Step S501 comprises determining a transformation between the points of the source set and the points of the best matching target set (or vice versa).

Step S601 comprises applying the transformation to register the source 3D point cloud to the target 3D point cloud (or vice versa).

Steps S501 and S601 are the same as steps S50 and S60. The comparison between the source set and target sets in Step S401 is the same as the comparison described between said sets in the implementations of the first group (e.g. step S40), although the sets themselves are determined differently. Whilst in the first group of implementations a set is determined based on which points fall within a 2D cell in a 2D projection, in the second group of implementations a set is determined based on which points are in a 3D cell, because in the first group of implementations the cells are 2D (as they are divided from the 2D overlapping portion) whereas in the second group of implementations the cells are 3D (as they are divided from the 3D overlap volume).

Estimating the 3D overlap volume in step S101 may comprise determining the 3D overlap volume defined in first and second dimensions by a 2D overlapping portion between a source 2D projection of the source 3D point cloud and a target 2D projection of the target 3D point cloud and in a third dimension by upper and lower bounds of the source and target 3D point clouds in the third dimension, the 2D overlapping portion corresponding to the overlapping region between the source and target geographical areas. The first and second dimensions are, for example, latitude and longitude (as in the implementations of the first group).

Estimating the 3D overlap volume in step S101 may comprise: determining a 2D overlapping portion between a source 2D projection of the source 3D point cloud and a target 2D projection of the target 3D point cloud, the 2D overlapping portion corresponding to the overlapping region between the source and target geographical areas (in the same way that the 2D overlapping portion is determined in the implementations of the first group); and determining the 3D overlap volume defined in first and second dimensions by the 2D overlapping portion and in a third dimension by upper and lower bounds of the source and target 3D point clouds in the third dimension.

The said overlap cell and its surrounding cells may form a (3D) Moore neighborhood with the said overlap cell as a central cell.

The target sets (for a said overlap cell) may be determined as (target) sets of points of the target 3D point cloud which are in respective cells in a (3D) Moore neighborhood with the said overlap cell as a central cell (of the (3D) Moore neighborhood).

The surrounding cells of the said overlap cell may comprise cells orthogonally adjacent and diagonally adjacent to the said overlap cell in 3D.

As already indicated, the description of the first group of implementations applies to the second group of implementations, except those parts related to dividing the overlapping portion and determining which points will be used for the comparison based on the 2D cells.

The division of the 3D overlap volume (which may be referred to as the overlap volume or overlapping volume) may be based on a grid size. In some implementations, the grid size is set such that the volume of a resulting cell is greater than the total number of points in the overlap volume divided by the volume of the overlap volume. The grid size may be chosen with an average number of points per cell in mind. For example, the desired average number of points per cell may be used to determine the total number of cells and the grid size may be determined based on that number. Alternatively, the desired average number of points per cell may be used to determine a volume of each cell and the grid size may be determined based on that volume. The overlap volume is in some implementations divided into uniform orthogonal 3D cells (e.g. cuboids/cubes).

Considering implementations of the first and the second groups, the following points are noted.

Methods disclosed herein involve dividing point clouds to be registered into cells (specifically the overlapping portion/volume) and finding convex hulls of these cells—this allows for parallelization, thereby reducing time. Furthermore, separate threads of processing (e.g. as in FIG. 7—for color and/or for shape score) may be implemented on different processors of a computing system/device. The best matches of candidate points of the overlap portion/volume are determined by a matching algorithm (as described above—e.g. comparison processes described above, and FIG. 7) which may ensure that the source and target point clouds are matched via shape and color. The alignment of the complete point clouds may be performed using only some of the matching sets of points of the source and target point cloud points found in the matching algorithm stage (the best matching sets, e.g. highest similarity scores).

One or more methods/methodologies disclosed herein may be considered a framework for improving the efficiency of Lidar point cloud registration in terms of time and memory utilization. Methods/methodologies disclosed herein utilize a divide and conquer strategy by partitioning the overlapping portion/volume between the two point clouds into a grid of (2D or 3D) cells and determining the best sets of points for registration from the cells. The point clouds may be stitched together to generate a more complete 3D map. In order to handle large sizes of point clouds, point cloud data may be stored in one or more structured databases and only the relevant points may be loaded for computations rather than loading the entire large point clouds. The Divide and Conquer strategy is an algorithmic technique used to solve complex problems by breaking them down into smaller, more manageable subproblems—each subproblem may be solved independently and their solutions combined to obtain the solution for the original problem. The Divide and Conquer strategy has been used in Fast Fourier Transform, Strassen's Matrix Multiplication, Convex Hull determination, Karatsuba algorithm, etc.

The methods/methodologies disclosed herein may be adopted/used in a number of applications, including but not limited to:

Lidar mapping

Autonomous Driving: Lidar registration holds significant importance in the realm of self-driving automobiles and other independent mobile units. Through the fusion of multiple lidar scans, such vehicles may construct a comprehensive and current 3D terrain representation/map, enabling secure navigation and on-the-fly decision-making.

- 3D Mapping and Modelling: Lidar registration is a vital process used to generate detailed 3D maps and models of different surroundings like urban areas, woodlands, elevated terrains, and enclosed indoor areas. These 3D depictions play a crucial role in tasks such as city planning, ecological surveillance, and the development of virtual reality experiences.
- Robotics and UAVs: Lidar registration finds application in the fields of robotics/UGVs and unmanned aerial vehicles (UAVs) for tasks like precise positioning, obstacle identification, and comprehensive environmental comprehension. This technology empowers robots and drones to attain precise and streamlined awareness of their surroundings.

The methods/methodologies disclosed herein may be used for registration of any point clouds (not necessarily Lidar data).

An objective of methods/methodologies disclosed herein may be considered to be how to improve the memory utilization and time taken for point cloud registration while preserving the alignment accuracy.

Methods/methodologies disclosed herein may achieve a number of advantages, including but not limited to any of the following.

- To solve the problem of handling large point clouds and for faster runtime, a Divide and Conquer-style strategy is adopted.
- For the (2D or 3D) overlap cells c, the respective comparison processes may be performed in parallel, reducing processing time. Furthermore, separate threads of processing (e.g. as in FIG. 7—for color and/or for shape score) may be implemented on different processors of a computing system/device.
- The determination of convex hulls in the comparison process retains the geometry of the point clouds.
- The comparison process and optionally the threshold-based selection of matching pairs allows for only a subset of points to be used for registration rather than all points of the point clouds or all points in the overlapping portion/volume, thereby reducing processing burden and processing time. This is particularly helpful for large-sized point clouds as much fewer points need to be considered when determining a transformation matrix.
- In order to handle large sizes of point clouds, point cloud data may be stored in one or more structured databases and only the relevant points may be loaded for computations rather than loading the entire large point clouds. This is particularly helpful for large-sized point clouds as much fewer points need to be considered when determining a transformation matrix. The number of points in the overlapping portion/volume is fewer than the overall number of points in the point clouds and is often significantly lower. Furthermore, not all the points in the overlapping portion/volume need to be considered when determining the transformation matrix as noted above.
- Previous techniques involve extracting features by applying a DNN on a full point cloud and/or employing a local descriptor across the entire point cloud, which require a lot of memory especially for large-scale point clouds. As noted above, these problems are overcome by methods/methodologies disclosed herein.

The comparative methods 1-4 have the following disadvantages which are overcome by methods/methodologies disclosed herein.

Comparative Method 1:

This method involves a deep learning-based approach and encounters challenges when dealing with large point clouds due to limitations in creating large neural networks, especially memory-intensive CNNs, on standard GPUs. Moreover, handling millions of points in a point cloud becomes infeasible due to the large number of trainable parameters, making optimization and training processes highly challenging. Additionally, obtaining such large, labelled data for supervised approaches is difficult for massive point clouds. These problems are overcome in methods/methodologies disclosed herein due to, among other aspects, the consideration of the overlapping portion/volume rather than an entire point cloud, the comparison process, and the optional threshold-based selection of matching points for use in determining a transformation matrix.

Comparative Method 2:

This method involves computing descriptors for the entire point cloud, followed by dividing it into grids. This approach poses difficulties when dealing with point clouds containing millions of points, as loading and processing the entire cloud becomes challenging. Furthermore, the use of descriptors exhibits limited performance when applied to point clouds with repetitive structures, such as buildings and roads, making the descriptor-based approach prone to noise. Additionally, in the grid matching process after creating grids, this method relies on a voting algorithm but does not take advantage of GPS information for effective grid pairing. Also, due to the presence of multiple sequential steps in the method, such as descriptor finding, voting module, graph matching, and outlier filtering, this method may not be parallelized efficiently. These problems are overcome in methods/methodologies disclosed herein due to, among other aspects, the consideration of the overlapping portion/volume rather than an entire point cloud, the comparison process, and the optional threshold-based selection of matching points for use in determining a transformation matrix.

Comparative Method 3:

This method involves an unsupervised attention-based Encoder-Decoder approach that involves processing an entire point cloud to estimate a transformation matrix. Therefore, this approach suffers from computational inefficiency when dealing with large point clouds, leading to an impractical memory demand on standard GPUs. Furthermore, incorporating a Gaussian mixture model adds to the overall overhead, exacerbating the computational challenges. These problems are overcome in methods/methodologies disclosed herein due to, among other aspects, the consideration of the overlapping portion/volume rather than an entire point cloud, the comparison process, and the optional threshold-based selection of matching points for use in determining a transformation matrix.

Comparative Method 4:

The precision of this method heavily relies on canopy shape, making it a specialized technique tailored for aligning forest point clouds. This approach becomes less effective in scenarios with high point-density point clouds. This limitation stems from the method's conversion of 3D points into two-dimensional images, causing multiple 3D points to map onto the same 2D point. Consequently, identifying corresponding points becomes challenging and introduces inaccuracies in such situations. These problems are overcome in methods/methodologies disclosed herein due to, among other aspects, the consideration of the overlapping portion/volume and the comparison process (and the optional threshold-based selection of matching points for use in determining a transformation matrix may improve efficiency and throughput).

An objective of methods/methodologies disclosed herein may be considered to be how to improve the memory and time requirement of LIDAR registration and create a 3D Map of an entire region. Another objective may be considered to be how to achieve good accuracy for 3D map generation with less time and less memory utilization than other methods.

Figure 14:
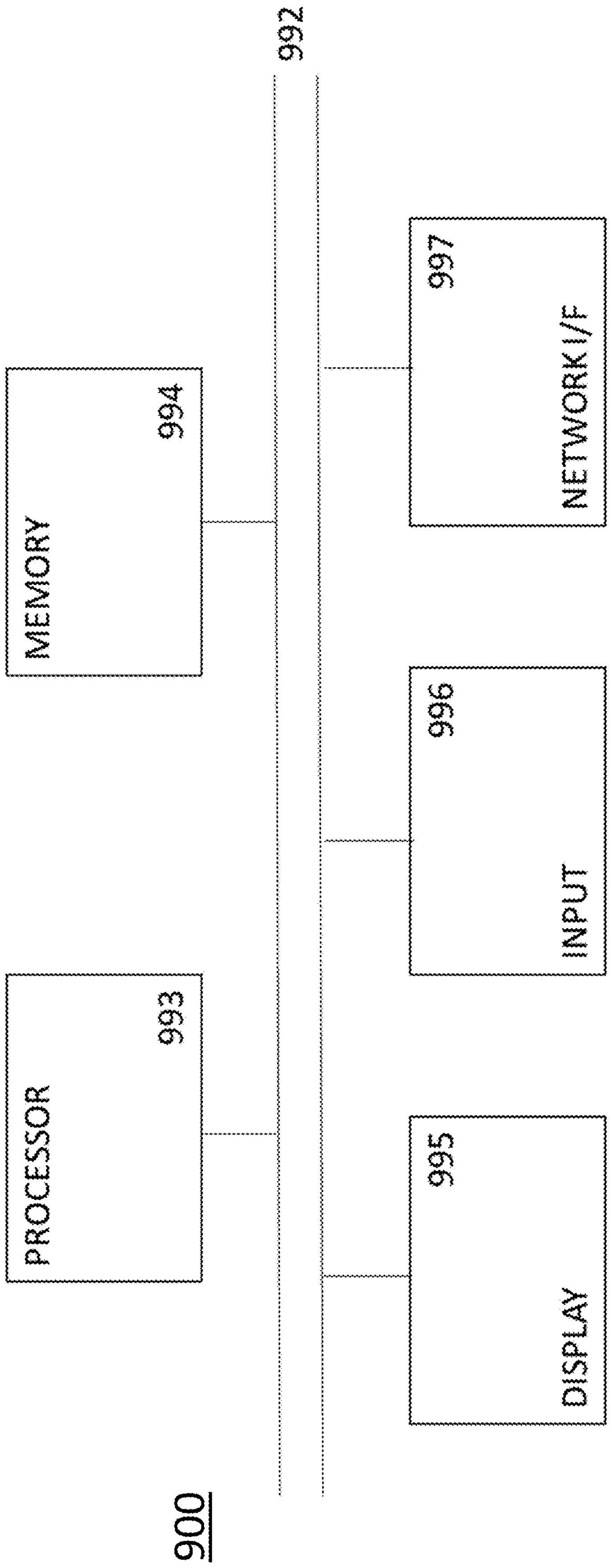
FIG. 14 is a diagram illustrating an apparatus.

FIG. 14 is a block diagram of an information processing apparatus 900 or a computing device 900, such as a data storage server, which embodies the present invention, and which may be used to implement some or all of the operations of a method embodying the present invention, and perform some or all of the tasks of apparatus of an embodiment. The computing device 900 may be used to implement any of the method steps described above, e.g. any of steps S10-S60 and/or any of steps S101-S601 and/or any steps of FIGS. 4-13.

The computing device 900 comprises a processor 993 and memory 994. Optionally, the computing device also includes a network interface 997 for communication with other such computing devices, for example with other computing devices of invention embodiments. Optionally, the computing device also includes one or more input mechanisms such as keyboard and mouse 996, and a display unit such as one or more monitors 995. These elements may facilitate user interaction. The components are connectable to one another via a bus 992.

The memory 994 may include a computer readable medium, which term may refer to a single medium or multiple media (e.g., a centralized or distributed database and/or associated caches and servers) configured to carry computer-executable instructions. Computer-executable instructions may include, for example, instructions and data accessible by and causing a computer (e.g., one or more processors) to perform one or more functions or operations. For example, the computer-executable instructions may include those instructions for implementing a method disclosed herein, or any method steps disclosed herein, for example any of steps S10-S60 and/or any of steps S101-S601 and/or any steps of FIGS. 4-13. Thus, the term "computer-readable storage medium" may also include any medium that is capable of storing, encoding or carrying a set of instructions for execution by the machine and that cause the machine to perform any one or more of the method steps of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement any of the method steps described herein. The memory 994 stores data being read and written by the processor 993 and may store information/data of points of point clouds and/or point clouds and/or sets of points and/or threshold information and/or cell data and/or grid data and/or color information and/or convex hull information and/or equations for computing similarity scores and/or similarity scores and/or a transformation matrix and/or a resultant point cloud and/or 2D projections of point clouds and/or data about a geographical region and/or latitude and longitude information and/or GPS data and/or distributions used for determining similarity scores and/or input data and/or other data, described above, and/or programs for executing any of the method steps described above.

As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and operations discussed herein. The processor 993 may be considered to comprise any of the modules described above. Any operations described as being implemented by a module may be implemented as a method by a computer and e.g. by the processor 993. Parallel processing as referred to above may be implemented by separate processors acting in parallel, the separate processors being physically separate processors or logical divisions. That is, the apparatus 10 may comprise multiple processors. Separate processors may each implement one or more threads of processing described above.

The display unit 995 may display a representation of data stored by the computing device, such as a representation of information/data of points of point clouds and/or point clouds and/or sets of points and/or threshold information and/or cell data and/or grid data and/or color information and/or convex hull information and/or equations for computing similarity scores and/or similarity scores and/or a transformation matrix and/or a resultant point cloud and/or 2D projections of point clouds and/or data about a geographical region and/or latitude and longitude information and/or GPS data and/or distributions used for determining similarity scores and/or input data and/or other data, and/or GUI windows and/or interactive representations enabling a user to interact with the apparatus 900 by e.g. drag and drop or selection interaction, and/or any other output described above, and may also display a cursor and dialog boxes and screens enabling interaction between a user and the programs and data stored on the computing device. The input mechanisms 996 may enable a user to input data and instructions to the computing device, such as enabling a user to input any user input described above.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

Methods embodying the present invention may be carried out on a computing device/apparatus 900 such as that illustrated in FIG. 14. Such a computing device need not have every component illustrated in FIG. 14, and may be composed of a subset of those components. For example, the apparatus 900 may comprise the processor 993 and the memory 994 connected to the processor 993. Or the apparatus 900 may comprise the processor 993, the memory 994 connected to the processor 993, and the display 995. A method embodying the present invention may be carried out by a single computing device in communication with one or more data storage servers via a network. The computing device may be a data storage itself storing at least a portion of the data.

A method embodying the present invention may be carried out by a plurality of computing devices operating in cooperation with one another. One or more of the plurality of computing devices may be a data storage server storing at least a portion of the data.

The invention may be implemented in digital electronic circuitry, or in computer hardware, firmware, software, or in combinations of them. The invention may be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a stand-alone program or as a module, component, subroutine, or other unit suitable for use in a data processing environment. A computer program may be deployed to be executed on one module or on multiple modules at one site or distributed across multiple sites and interconnected by a communication network.

Method steps of the invention may be performed by one or more programmable processors executing a computer program to perform functions of the invention by operating on input data and generating output. Apparatus of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The above-described embodiments of the present invention may advantageously be used independently of any other of the embodiments or in any feasible combination with one or more others of the embodiments.

The disclosure extends to the following statements:

X1. A computer-implemented method comprising:
- determining a 2D overlapping portion between a source 2D projection of a source 3D point cloud and a target 2D projection of a target 3D point cloud, the source and target 3D point clouds representative of source and target geographical areas, respectively, the 2D overlapping portion corresponding to an overlapping region between the source and target geographical areas;
- dividing the 2D overlapping portion into a plurality of cells and determining at least one overlap cell which includes at least a first threshold number of points from the source 2D projection and at least a second threshold number of points from the target 2D projection;
- performing a comparison process for said overlap cell, the comparison process comprising:
  - determining a plurality of target sets of points comprising a first target set of points of the target 3D point cloud falling within said overlap cell and second and further target sets of points of the target 3D point cloud falling within cells neighboring said overlap cell, respectively,
  - determining a source set of points comprising points of the 3D source point cloud that fall within said overlap cell,
  - comparing the source set with each of the plurality of target sets to determine a plurality of similarity scores for the plurality of target sets, respectively, and
  - based on the similarity scores, selecting a best matching target set;
- determining a transformation between the points of the source set and the points of the best matching target set or vice versa; and
- applying the transformation to register the source 3D point cloud to the target 3D point cloud or vice versa.

X2. The computer-implemented method according to statement X1, further comprising determining the overlapping region between the source and target geographical areas based on GPS data.

X3. The computer-implemented method according to statement X1 or statement X2, wherein the target sets for a said overlap cell are determined as target sets of points of the target 3D point cloud falling within respective cells in a Moore neighborhood with said overlap cell as a central cell of the Moore neighborhood.

X4. The computer-implemented method according to any of statements X1-X3, wherein comparing the source set with each of the plurality of target sets comprises determining a source convex hull of the points of the source set and determining a plurality of target convex hulls of the points of the plurality of target sets, respectively, and comparing the source convex hull with each target convex hull.

X5. The computer-implemented method according to any of statements X1-X3, wherein comparing the source set with each of the plurality of target sets comprises, for each target set:
- performing a first comparison between a shape of the points of the source set and a shape of the points of the target set to determine a first contribution to the similarity score for the target set; and/or
- performing a second comparison between intensities of the points of the source set and intensities of the points of the target set to determine a second contribution to the similarity score for the target set.

X6. The computer-implemented method according to any of statements X1-X3, wherein comparing the source set with each of the plurality of target sets comprises performing a first and/or a second comparison process,
- wherein the first comparison process comprises determining a convex hull of the points of the source set and determining a first distribution of dihedral angles of the convex hull of the points of the source set and, for each target set:

determining a convex hull of the points of the target set;

determining a second distribution of dihedral angles of the convex hull of the points of the target set;

computing a divergence between the first and second distributions of dihedral angles; and adding a contribution to the similarity score for the target set based on the computed divergence, and wherein the second comparison process comprises determining a first distribution of intensity of points in the source set and, for each target set:

determining a second distribution of intensity of points in the target set;

computing a distance measure between the first and second distributions of intensity; and adding a contribution to the similarity score for the target set based on the computed divergence.

X7. The computer-implemented method according to any of statements X1-X6, comprising, when a plurality of overlap cells are determined:

performing the comparison process for each overlap cell;

determining a final target set of points comprising the points of at least one of said best matching target sets and determining a final source set of points comprising the points of said corresponding at least one source set; and determining the transformation between the points of the final source set and the points of the final target set.

X8. The computer-implemented method according to statement X7, wherein determining a final target set of points comprises selecting at least one of the best matching target sets with a similarity score above a threshold score or with the highest similarity score and determining the final target set of points as including the points of the at least one selected best matching target set.

X9. A computer program which, when run on a computer, causes the computer to carry out a method comprising:

determining a 2D overlapping portion between a source 2D projection of a source 3D point cloud and a target 2D projection of a target 3D point cloud, the source and target 3D point clouds representative of source and target geographical areas, respectively, the 2D overlapping portion corresponding to an overlapping region between the source and target geographical areas;

dividing the 2D overlapping portion into a plurality of cells and determining at least one overlap cell which includes at least a first threshold number of points from the source 2D projection and at least a second threshold number of points from the target 2D projection;

performing a comparison process for said overlap cell, the comparison process comprising:

determining a plurality of target sets of points comprising a first target set of points of the target 3D point cloud falling within said overlap cell and second and further target sets of points of the target 3D point cloud falling within cells neighboring said overlap cell, respectively, determining a source set of points comprising points of the 3D source point cloud that fall within said overlap cell, comparing the source set with each of the plurality of target sets to determine a plurality of similarity scores for the plurality of target sets, respectively, and based on the similarity scores, selecting a best matching target set;

determining a transformation between the points of the source set and the points of the best matching target set or vice versa; and applying the transformation to register the source 3D point cloud to the target 3D point cloud or vice versa.

X10. An information processing apparatus comprising a memory and a processor connected to the memory, wherein the processor is configured to:

determine a 2D overlapping portion between a source 2D projection of a source 3D point cloud and a target 2D projection of a target 3D point cloud, the source and target 3D point clouds representative of source and target geographical areas, respectively, the 2D overlapping portion corresponding to an overlapping region between the source and target geographical areas;

divide the 2D overlapping portion into a plurality of cells and determine at least one overlap cell which includes at least a first threshold number of points from the source 2D projection and at least a second threshold number of points from the target 2D projection;

perform a comparison process for said overlap cell, the comparison process comprising:

determining a plurality of target sets of points comprising a first target set of points of the target 3D point cloud falling within said overlap cell and second and further target sets of points of the target 3D point cloud falling within cells neighboring said overlap cell, respectively, determining a source set of points comprising points of the 3D source point cloud that fall within said overlap cell, comparing the source set with each of the plurality of target sets to determine a plurality of similarity scores for the plurality of target sets, respectively, and based on the similarity scores, selecting a best matching target set;

determine a transformation between the points of the source set and the points of the best matching target set or vice versa; and apply the transformation to register the source 3D point cloud to the target 3D point cloud or vice versa.

Y1. A computer-implemented method comprising:

estimating a 3D overlap volume between a source 3D point cloud and a target 3D point cloud based on an overlapping region between source and target geographical areas, the source and target 3D point clouds representative of the source and target geographical areas, respectively;

dividing the 3D overlap volume into a plurality of cells and determining at least one overlap cell which includes at least a first threshold number of points from the source 3D point cloud and at least a second threshold number of points from the target 3D point cloud;

performing a comparison process for said overlap cell, the comparison process comprising:

determining a plurality of target sets of points comprising a first target set of points of the target 3D point cloud which are in said overlap cell and second and further target sets of points of the target 3D point cloud which are in cells neighboring said overlap cell, respectively, determining a source set of points comprising points of the 3D source point cloud which are in said overlap cell, comparing the source set with each of the plurality of target sets to determine a plurality of similarity scores for the plurality of target sets, respectively, and based on the similarity scores, selecting a best matching target set;

determining a transformation between the points of the source set and the points of the best matching target set or vice versa; and applying the transformation to register the source 3D point cloud to the target 3D point cloud or vice versa.

Y2. The computer-implemented method according to statement Y1, wherein estimating the 3D overlap volume comprises determining the 3D overlap volume defined in first and second dimensions by a 2D overlapping portion between a source 2D projection of the source 3D point cloud and a target 2D projection of the target 3D point cloud and in a third dimension by upper and lower bounds of the source and target 3D point clouds in the third dimension, the 2D overlapping portion corresponding to the overlapping region between the source and target geographical areas.

Y3. The computer-implemented method according to statement Y1 or statement Y2, wherein the target sets for said overlap cell are determined as target sets of points of the target 3D point cloud which are in respective cells in a Moore neighborhood with said overlap cell as a central cell of the Moore neighborhood.

Y4. The computer-implemented method according to any of statements Y1-Y3, wherein comparing the source set with each of the plurality of target sets comprises determining a source convex hull of the points of the source set and determining a plurality of target convex hulls of the points of the plurality of target sets, respectively, and comparing the source convex hull with each target convex hull.

Y5. The computer-implemented method according to any of statements Y1-Y3, wherein comparing the source set with each of the plurality of target sets comprises, for each target set:

performing a first comparison between a shape of the points of the source set and a shape of the points of the target set to determine a first contribution to the similarity score for the target set; and/or performing a second comparison between intensities of the points of the source set and intensities of the points of the target set to determine a second contribution to the similarity score for the target set.

Y6. The computer-implemented method according to any of statements Y1-Y3, wherein comparing the source set with each of the plurality of target sets comprises performing a first and/or a second comparison process, wherein the first comparison process comprises determining a convex hull of the points of the source set and determining a first distribution of dihedral angles of the convex hull of the points of the source set and, for each target set:

determining a convex hull of the points of the target set;

determining a second distribution of dihedral angles of the convex hull of the points of the target set;

computing a divergence between the first and second distributions of dihedral angles; and adding a contribution to the similarity score for the target set based on the computed divergence, and wherein the second comparison process comprises determining a first distribution of intensity of points in the source set and, for each target set:

determining a second distribution of intensity of points in the target set;

computing a distance measure between the first and second distributions of intensity; and adding a contribution to the similarity score for the target set based on the computed divergence.

Y7. The computer-implemented method according to any of statements Y1-Y6, comprising, when a plurality of overlap cells are determined:

performing the comparison process for each overlap cell;

determining a final target set of points comprising the points of at least one of said best matching target sets and determining a final source set of points comprising the points of said corresponding at least one source set; and determining the transformation between the points of the final source set and the points of the final target set.

Y8. The computer-implemented method according to statement Y7, wherein determining a final target set of points comprises selecting at least one of the best matching target sets with a similarity score above a threshold score or with the highest similarity score and determining the final target set of points as including the points of the at least one selected best matching target set.

Y9. A computer program which, when run on a computer, causes the computer to carry out a method comprising:

estimating a 3D overlap volume between a source 3D point cloud and a target 3D point cloud based on an overlapping region between source and target geographical areas, the source and target 3D point clouds representative of the source and target geographical areas, respectively;

dividing the 3D overlap volume into a plurality of cells and determining at least one overlap cell which includes at least a first threshold number of points from the source 3D point cloud and at least a second threshold number of points from the target 3D point cloud;

performing a comparison process for said overlap cell, the comparison process comprising:

determining a plurality of target sets of points comprising a first target set of points of the target 3D point cloud which are in said overlap cell and second and further target sets of points of the target 3D point cloud which are in cells neighboring said overlap cell, respectively, determining a source set of points comprising points of the 3D source point cloud which are in said overlap cell, comparing the source set with each of the plurality of target sets to determine a plurality of similarity scores for the plurality of target sets, respectively, and based on the similarity scores, selecting a best matching target set;

determining a transformation between the points of the source set and the points of the best matching target set or vice versa; and applying the transformation to register the source 3D point cloud to the target 3D point cloud or vice versa.

Y10. An information processing apparatus comprising a memory and a processor connected to the memory, wherein the processor is configured to:

estimate a 3D overlap volume between a source 3D point cloud and a target 3D point cloud based on an overlapping region between source and target geographical areas, the source and target 3D point clouds representative of the source and target geographical areas, respectively;

divide the 3D overlap volume into a plurality of cells and determine at least one overlap cell which includes at least a first threshold number of points from the source 3D point cloud and at least a second threshold number of points from the target 3D point cloud;

perform a comparison process for said overlap cell, the comparison process comprising:

determining a plurality of target sets of points comprising a first target set of points of the target 3D point cloud which are in said overlap cell and second and further target sets of points of the target 3D point cloud which are in cells neighboring said overlap cell, respectively, determining a source set of points comprising points of the 3D source point cloud which are in said overlap cell, comparing the source set with each of the plurality of target sets to determine a plurality of similarity scores for the plurality of target sets, respectively, and based on the similarity scores, selecting a best matching target set;

determine a transformation between the points of the source set and the points of the best matching target set or vice versa; and apply the transformation to register the source 3D point cloud to the target 3D point cloud or vice versa.

The Disclosure Extends to the Following Statements(S):

S1. A computer-implemented method comprising:

determining a 2D (2-dimensional) overlapping portion between a source 2D projection of a source 3D (3-dimensional) point cloud and a target 2D projection of a target 3D point cloud, the source and target 3D point clouds representative of source and target geographical areas, respectively, the 2D overlapping portion corresponding to an overlapping region between the source and target geographical areas;

dividing the 2D overlapping portion into a plurality of cells and determining at least one overlap cell which includes at least a first threshold number of points from the source 2D projection and at least a second threshold number of points from the target 2D projection (or determining at least one cell which includes at least a first threshold number of points from the source 2D projection and at least a second threshold number of points from the target 2D projection as at least one overlap cell);

performing a comparison process for said (or a said) overlap cell, the comparison process (for said/the overlap cell) comprising:

determining a plurality of target sets of points comprising a first (target) set of points of the target 3D point cloud falling within said/the overlap cell (in the target 2D projection) and second and further (target) sets of points of the target 3D point cloud falling within cells neighboring/surrounding said/the overlap cell (in the target 2D projection), respectively, determining a source set of points comprising points of the 3D source point cloud that fall within said/the overlap cell (in the source 2D projection), comparing the source set with each of the plurality of target sets to determine a plurality of similarity scores for the plurality of target sets, respectively, (each similarity score quantifying similarity between the source set and a said target set,) and based on the similarity scores, selecting a best matching target set;

determining a transformation (matrix) between the points of the source set and the points of the best matching target set or vice versa; and applying the transformation (matrix) (to the source 3D point cloud) to register the source 3D point cloud to the target 3D point cloud or vice versa.

S2. The computer-implemented method according to statement S1, comprising determining the source 2D projection of the source 3D point cloud and the target 2D projection of the target 3D point cloud.

S3. The computer-implemented method according to statement S1 or S2, wherein the first and/or threshold number is one or two or three.

S4. The computer-implemented method according to any of the preceding S statements, wherein the first and second threshold numbers are the same as each other.

S5. The computer-implemented method according to any of the preceding S statements, further comprising determining the overlapping region between the source and target geographical areas based on GPS data.

S6. The computer-implemented method according to any of the preceding S statements, wherein the said overlap cell and its surrounding cells form a (2D) Moore neighborhood with the said overlap cell as a central cell.

S7. The computer-implemented method according to any of the preceding S statements, wherein the target sets (for a said overlap cell) are determined as (target) sets of points of the target 3D point cloud falling within respective cells in a (2D) Moore neighborhood with the said overlap cell as a central cell (of the (2D) Moore neighborhood).

S8. The computer-implemented method according to any of the preceding S statements, wherein comparing the source set with each of the plurality of target sets comprises determining a source convex hull of the points of the source set and determining a plurality of target convex hulls of the points of the plurality of target sets, respectively, and comparing the source convex hull with each target convex hull.

S9. The computer-implemented method according to any of the preceding S statements, comprising determining a contribution to the similarity score for each target set based on the comparison of the source convex hull with the said target convex hull concerned.

S10. The computer-implemented method according to any of the preceding S statements, wherein comparing the source set with each of the plurality of target sets comprises, for each target set: performing a first comparison between a shape of the points of the source set and a shape of the points of the target set to determine a first contribution to the similarity score for the target set; and/or performing a second comparison between (color) intensities of the points of the source set and (color) intensities of the points of the target set to determine a second contribution to the similarity score for the target set.

S11. The computer-implemented method according to any of the preceding S statements, wherein comparing the source set with each of the plurality of target sets comprises, for each target set, performing the first and second comparisons and combining the first and second contributions to determine the similarity score for the target set.

S12. The computer-implemented method according to any of the preceding S statements, wherein comparing the source set with each of the plurality of target sets comprises, for each target set: performing a first comparison between a shape of the points of the source set and a shape of the points of the target set to determine a first contribution to the similarity score for the target set; performing a second comparison between (color) intensities of the points of the source set and (color) intensities of the points of the target set to determine a second contribution to the similarity score for the target set; and combining the first and second contributions to determine the similarity score for the target set.

S13. The computer-implemented method according to any of the preceding S statements, wherein comparing the source set with each of the plurality of target sets comprises performing a first and/or a second comparison process, wherein the first comparison process comprises determining a convex hull of the points of the source set and determining a first distribution of dihedral angles of the convex hull of the points of the source set and, for each target set: determining a convex hull of the points of the target set; determining a second distribution of dihedral angles of the convex hull of the points of the target set; computing a divergence between the first and second distributions of dihedral angles; and adding a contribution to the similarity score for the target set based on the computed divergence, and wherein the second comparison process comprises determining a first distribution of (color) intensity of points in the source set and, for each target set: determining a second distribution of (color) intensity of points in the target set; computing a distance measure/similarity measure between the first and second distributions of intensity; and adding a contribution to the similarity score for the target set based on the computed divergence.

S14. The computer-implemented method according to any of the preceding S statements, wherein comparing the source set with each of the plurality of target sets comprises determining a convex hull of the points of the source set and determining a first distribution of dihedral angles of the convex hull of the points of the source set and, for each target set: determining a convex hull of the points of the target set; determining a second distribution of dihedral angles of the convex hull of the points of the target set; computing a divergence between the first and second distributions of dihedral angles; and adding a contribution to the similarity score for the target set based on the computed divergence.

S15. The computer-implemented method according to any of statements S13-S14, wherein the divergence is a Kullback-Leibler divergence.

S16. The computer-implemented method according to any of statements S8-S15, wherein determining the convex hulls comprises using farthest point sampling on the set of points concerned.

S17. The computer-implemented method according to any of the preceding S statements, wherein comparing the source set with each of the plurality of target sets comprises, for each target set, comparing (color) intensity of the points of the source set with (color) intensity of the points of the target set.

S18. The computer-implemented method according to statement S17, wherein comparing the (color) intensity of the points of the source set with the (color) intensity of the points of a said target set comprises using a histogram-based measure.

S19. The computer-implemented method according to statement S17 or S18, wherein comparing the color of the points of the source set with the color of the points of a said target set comprises determining a first distribution of (color) intensity of the points of the source set and a second distribution of (color) intensity of the points of the target set and comparing the first and second distributions of intensity.

S20. The computer-implemented method according to statement S19, comprising determining a contribution to the similarity score for each target set based on the comparison of the first distribution of intensity with the second distribution of intensity concerned.

S21. The computer-implemented method according to statement S19 or S20, wherein comparing the first and second distributions of intensity comprises determining a distance measure/similarity measure between the distributions.

S22. The computer-implemented method according to any of statements S13-S21, comprising determining a contribution to the similarity score for each target set based on the distance measure/similarity measure corresponding to the target set.

S23. The computer-implemented method according to any of statements S19-S22, wherein the first and second distributions of intensity are determined as histograms of the intensity of points in the set concerned.

S24. The computer-implemented method according to any of statements S19-S23, wherein the first and second distributions of intensity are distributions of RGB or CYMK colors of the points in the set concerned or distributions of LiDAR intensity of the points in the set concerned.

S25. The computer-implemented method according to any of statements S19-S24, wherein the first and second distributions of intensity are determined as histograms RGB or CYMK colors or LiDAR intensity of the points in the set concerned.

S26. The computer-implemented method according to any of statements S13-S25, wherein the distance measure/similarity measure comprises a Bhattacharyya distance.

S27. The computer-implemented method according to any of the preceding S statements, wherein comparing the source set with each of the plurality of target sets comprises determining a first distribution of (color) intensity of points in the source set and, for each target set: determining a second distribution of (color) intensity of points in the target set; computing a distance measure/similarity measure between the first and second distributions of intensity; and adding a contribution to the similarity score for the target set based on the computed divergence.

S28. The computer-implemented method according to statement S27, wherein the distance measure/similarity measure comprises a Bhattacharyya distance.

S29. The computer-implemented method according to statement S27 or S28, wherein the first and second distributions of intensity are determined as histograms of RGB or CYMK colors or LiDAR intensity of the points in the set concerned.

S30. The computer-implemented method according to any of statements S9-S29, wherein comparing the source set with each of the plurality of target sets comprises, for each target set, combining the first and second contributions to determine the similarity score for the target set.

S31. The computer-implemented method according to any of the preceding S statements, wherein determining the transformation matrix comprises determining the transformation matrix using an iterative closest point, ICP, algorithm.

S32. The computer-implemented method according to any of the preceding S statements, comprising, when a plurality of overlap cells are determined: performing the comparison process for each overlap cell (to determine a plurality of best matching target sets corresponding to a plurality of source sets, each source set corresponding to an overlap cell); determining a final target set of points comprising the points of at least one of said/the best matching target sets and determining a final source set of points comprising the points of said/the corresponding at least one source set (corresponding to the at least one best matching target set); and determining the transformation matrix between the points of the final source set and the points of the final target set.

S33. The computer-implemented method according to statement S32, wherein determining a final target set of points comprise selecting at least one of the best matching target sets with a similarity score above a threshold score or with the highest similarity score and determining the final target set of points as including the points of the at least one selected best matching target set.

S34. The computer-implemented method according to any of the preceding S statements, wherein the source 2D projection comprises points representative of the points of the source 3D point cloud and the target 2D projection comprises points representative of the points of the target 3D point cloud.

S35. The computer-implemented method according to any of the preceding S statements, wherein the points in the source 3D point cloud falling within a said overlap cell are points whose representative points in the source 2D projection are within the overlap cell, and points in the target 3D point cloud falling within a said cell are points whose representative points in the target 2D projection are within the cell.

S36. The computer-implemented method according to any of the preceding S statements, wherein the source and target 3D point clouds comprise LiDAR scanning data.

S37. A computer-implemented method comprising: determining a source 2D projection of a source 3D point cloud representative of a source geographical area and determining a target 2D projection of a target 3D point cloud representative of a target geographical area; determining a 2D overlapping portion between the source and target 2D projections corresponding to an overlapping region between the source and target geographical areas; dividing the 2D overlapping portion into a plurality of cells and determining at least one overlap cell which includes at least a first threshold number of points from the source 2D projection and at least a second threshold number of points from the target 2D projection (or determining at least one cell which includes at least a first threshold number of points from the source 2D projection and at least a second threshold number of points from the target 2D projection as at least one overlap cell); performing a comparison process for said (or a said) overlap cell, the comparison process comprising: determining a plurality of target sets of points comprising a first (target) set of points of the target 3D point cloud falling within said/the overlap cell (in the target 2D projection) and second and further (target) sets of points of the target 3D point cloud falling within cells neighboring/surrounding said/the overlap cell (in the target 2D projection), respectively, determining a source set of points comprising points of the 3D source point cloud that fall within said/the overlap cell (in the source 2D projection), comparing the source set with each of the plurality of target sets to determine a plurality of similarity scores for the plurality of target sets, respectively, (each similarity score quantifying similarity between the source set and a said target set,) and based on the similarity scores, selecting a best matching target set; determining a transformation (matrix) between the points of the source set and the points of the best matching target set or vice versa; and applying the transformation (matrix) (to the source 3D point cloud) to register the source 3D point cloud to the target 3D point cloud or vice versa.

S38. A computer-implemented method comprising: determining a source 2D projection of a source 3D point cloud representative of a source geographical area and determining a target 2D projection of a target 3D point cloud representative of a target geographical area; determining a 2D overlapping portion between the source and target 2D projections corresponding to an overlapping region between the source and target geographical areas; dividing the 2D overlapping portion into a plurality of cells and determining at least one overlap cell which includes at least a first threshold number of points from the source 2D projection and at least a second threshold number of points from the target 2D projection (or determining at least one cell which includes at least a first threshold number of points from the source 2D projection and at least a second threshold number of points from the target 2D projection as at least one overlap cell); for each (said) overlap cell: determining a plurality of target sets of points comprising a first (target) set of points of the target 3D point cloud falling within the overlap cell and second and further (target) sets of points of the target 3D point cloud falling within cells neighboring/surrounding the overlap cell, respectively, determining a source set of points comprising points of the 3D source point cloud that fall within the overlap cell, comparing the source set with each of the plurality of target sets to determine a plurality of similarity scores for the plurality of target sets, respectively, (each similarity score quantifying similarity between the source set and a said target set,) and based on the similarity scores, selecting a best matching target set; determining a final target set of points comprising the points of at least one of said/the best matching target sets and determining a final source set of points comprising the points of said/the corresponding at least one source set (corresponding to the at least one best matching target set); determining a transformation (matrix) between the points of the final source set and the points of the final target set or vice versa; and applying the transformation (matrix) (to the source 3D point cloud) to register the source 3D point cloud to the target 3D point cloud or vice versa.

S39. A computer program which, when run on a computer, causes the computer to carry out a method comprising: determining a 2D overlapping portion between a source 2D projection of a source 3D point cloud and a target 2D projection of a target 3D point cloud, the source and target 3D point clouds representative of source and target geographical areas, respectively, the 2D overlapping portion corresponding to an overlapping region between the source and target geographical areas; dividing the 2D overlapping portion into a plurality of cells and determining at least one overlap cell which includes at least a first threshold number of points from the source 2D projection and at least a second threshold number of points from the target 2D projection (or determining at least one cell which includes at least a first threshold number of points from the source 2D projection and at least a second threshold number of points from the target 2D projection as at least one overlap cell); performing a comparison process for said (or a said) overlap cell, the comparison process (for said/the overlap cell) comprising: determining a plurality of target sets of points comprising a first (target) set of points of the target 3D point cloud falling within said/the overlap cell (in the target 2D projection) and second and further (target) sets of points of the target 3D point cloud falling within cells neighboring/surrounding said/the overlap cell (in the target 2D projection), respectively, determining a source set of points comprising points of the 3D source point cloud that fall within said/the overlap cell (in the source 2D projection), comparing the source set with each of the plurality of target sets to determine a plurality of similarity scores for the plurality of target sets, respectively, (each similarity score quantifying similarity between the source set and a said target set,) and based on the similarity scores, selecting a best matching target set; determining a transformation (matrix) between the points of the source set and the points of the best matching target set or vice versa; and applying the transformation (matrix) (to the source 3D point cloud) to register the source 3D point cloud to the target 3D point cloud or vice versa.

S40. An information processing apparatus comprising a memory and a processor connected to the memory, wherein the processor is configured to: determine a 2D overlapping portion between a source 2D projection of a source 3D point cloud and a target 2D projection of a target 3D point cloud, the source and target 3D point clouds representative of source and target geographical areas, respectively, the 2D overlapping portion corresponding to an overlapping region between the source and target geographical areas; divide the 2D overlapping portion into a plurality of cells and determine at least one overlap cell which includes at least a first threshold number of points from the source 2D projection and at least a second threshold number of points from the target 2D projection (or determining at least one cell which includes at least a first threshold number of points from the source 2D projection and at least a second threshold number of points from the target 2D projection as at least one overlap cell); perform a comparison process for said (or a said) overlap cell, the comparison process (for said/the overlap cell) comprising: determining a plurality of target sets of points comprising a first (target) set of points of the target 3D point cloud falling within said/the overlap cell (in the target 2D projection) and second and further (target) sets of points of the target 3D point cloud falling within cells neighboring/surrounding said/the overlap cell (in the target 2D projection), respectively, determining a source set of points comprising points of the 3D source point cloud that fall within said/the overlap cell (in the source 2D projection), comparing the source set with each of the plurality of target sets to determine a plurality of similarity scores for the plurality of target sets, respectively, (each similarity score quantifying similarity between the source set and a said target set,) and based on the similarity scores, selecting a best matching target set; determine a transformation (matrix) between the points of the source set and the points of the best matching target set or vice versa; and apply the transformation (matrix) (to the source 3D point cloud) to register the source 3D point cloud to the target 3D point cloud or vice versa.

The Disclosure Extends to the Following Statements (B):

B1. A computer-implemented method comprising:

estimating a 3D (3-dimensional) overlap volume between a source 3D point cloud and a target 3D point cloud based on an overlapping region between source and target geographical areas, the source and target 3D point clouds representative of the source and target geographical areas, respectively;

dividing the 3D overlap volume into a plurality of cells and determining at least one overlap cell which includes at least a first threshold number of points from the source 3D point cloud and at least a second threshold number of points from the target 3D point cloud (or determining at least one cell which includes at least a first threshold number of points from the source 3D point cloud and at least a second threshold number of points from the target 3D point cloud as at least one overlap cell);

performing a comparison process for said (or a said) overlap cell, the comparison process (for said/the overlap cell) comprising:

determining a plurality of target sets of points comprising a first (target) set of points of the target 3D point cloud which are in said/the overlap cell and second and further (target) sets of points of the target 3D point cloud which are in cells neighboring/surrounding said/the overlap cell, respectively, determining a source set of points comprising points of the 3D source point cloud which are in said/the overlap cell, comparing the source set with each of the plurality of target sets to determine a plurality of similarity scores for the plurality of target sets, respectively, (each similarity score quantifying similarity between the source set and a said target set,) and based on the similarity scores, selecting a best matching target set;

determining a transformation (matrix) between the points of the source set and the points of the best matching target set or vice versa; and applying the transformation (matrix) (to the source 3D point cloud) to register the source 3D point cloud to the target 3D point cloud or vice versa.

B2. The computer-implemented method according to statement B1, wherein estimating the 3D overlap volume comprises determining the 3D overlap volume defined in first and second dimensions by a 2D overlapping portion between a source 2D projection of the source 3D point cloud and a target 2D projection of the target 3D point cloud and in a third dimension by upper and lower bounds of the source and target 3D point clouds in the third dimension, the 2D overlapping portion corresponding to the overlapping region between the source and target geographical areas.

B3. The computer-implemented method according to statement B1, wherein estimating the 3D overlap volume comprises: determining a 2D overlapping portion between a source 2D projection of the source 3D point cloud and a target 2D projection of the target 3D point cloud, the 2D overlapping portion corresponding to the overlapping region between the source and target geographical areas; and determining the 3D overlap volume defined in first and second dimensions by the 2D overlapping portion and in a third dimension by upper and lower bounds of the source and target 3D point clouds in the third dimension.

B4. The computer-implemented method according to any of the preceding B statements, wherein the said overlap cell and its surrounding cells form a (3D) Moore neighborhood with the said overlap cell as a central cell.

B5. The computer-implemented method according to any of the preceding B statements, wherein the target sets (for a said overlap cell) are determined as (target) sets of points of the target 3D point cloud which are in respective cells in a (3D) Moore neighborhood with the said overlap cell as a central cell (of the (3D) Moore neighborhood).

B6. The computer-implemented method according to statement B4 or B5, wherein the surrounding cells of the said overlap cell comprise cells orthogonally adjacent and diagonally adjacent to the said overlap cell.

B7. The computer-implemented method according to any of statements B2-B6, comprising determining the source 2D projection of the source 3D point cloud and the target 2D projection of the target 3D point cloud.

B8. The computer-implemented method according to any of the preceding B statements, wherein the first and/or second threshold number is one or two or three.

B9. The computer-implemented method according to any of the preceding B statements, wherein the first and second threshold numbers are the same as each other.

B10. The computer-implemented method according to any of statements B2-B9, comprising determining the overlapping region between the source and target geographical areas based on GPS data.

B11. The computer-implemented method according to any of the preceding B statements, wherein comparing the source set with each of the plurality of target sets comprises determining a source convex hull of the points of the source set and determining a plurality of target convex hulls of the points of the plurality of target sets, respectively, and comparing the source convex hull with each target convex hull.

B12. The computer-implemented method according to any of the preceding B statements, comprise determining a contribution to the similarity score for each target set based on the comparison of the source convex hull with the said target convex hull concerned.

B13. The computer-implemented method according to any of the preceding B statements, wherein comparing the source set with each of the plurality of target sets comprises, for each target set: performing a first comparison between a shape of the points of the source set and a shape of the points of the target set to determine a first contribution to the similarity score for the target set; and/or performing a second comparison between (color) intensities of the points of the source set and (color) intensities of the points of the target set to determine a second contribution to the similarity score for the target set.

B14. The computer-implemented method according to any of the preceding B statements, wherein comparing the source set with each of the plurality of target sets comprises, for each target set, performing the first and second comparisons and combining the first and second contributions to determine the similarity score for the target set.

B15. The computer-implemented method according to any of the preceding B statements, wherein comparing the source set with each of the plurality of target sets comprises, for each target set: performing a first comparison between a shape of the points of the source set and a shape of the points of the target set to determine a first contribution to the similarity score for the target set; performing a second comparison between (color) intensities of the points of the source set and (color) intensities of the points of the target set to determine a second contribution to the similarity score for the target set; and combining the first and second contributions to determine the similarity score for the target set.

B16. The computer-implemented method according to any of the preceding B statements, wherein comparing the source set with each of the plurality of target sets comprises performing a first and/or a second comparison process, wherein the first comparison process comprises determining a convex hull of the points of the source set and determining a first distribution of dihedral angles of the convex hull of the points of the source set and, for each target set: determining a convex hull of the points of the target set; determining a second distribution of dihedral angles of the convex hull of the points of the target set; computing a divergence between the first and second distributions of dihedral angles; and adding a contribution to the similarity score for the target set based on the computed divergence, and wherein the second comparison process comprises determining a first distribution of (color) intensity of points in the source set and, for each target set: determining a second distribution of (color) intensity of points in the target set; computing a distance measure/similarity measure between the first and second distributions of intensity; and adding a contribution to the similarity score for the target set based on the computed divergence.

B17. The computer-implemented method according to any of the preceding B statements, wherein comparing the source set with each of the plurality of target sets comprises determining a convex hull of the points of the source set and determining a first distribution of dihedral angles of the convex hull of the points of the source set and, for each target set: determining a convex hull of the points of the target set; determining a second distribution of dihedral angles of the convex hull of the points of the target set; computing a divergence between the first and second distributions of dihedral angles; and adding a contribution to the similarity score for the target set based on the computed divergence.

B18. The computer-implemented method according to statement B16 or B17, wherein the divergence is a Kullback-Leibler divergence.

B19. The computer-implemented method according to any of statements B11-B18, wherein determining the convex hulls comprise using farthest point sampling on the set of points concerned.

B20. The computer-implemented method according to any of the preceding B statements, wherein comparing the source set with each of the plurality of target sets comprises, for each target set, comparing (color) intensity of the points of the source set with (color) intensity of the points of the target set.

B21. The computer-implemented method according to statement B20, wherein comparing the (color) intensity of the points of the source set with the (color) intensity of the points of a said target set comprise using a histogram-based measure.

B22. The computer-implemented method according to statement B20 or B21, wherein comparing the color of the points of the source set with the color of the points of a said target set comprises determining a first distribution of (color) intensity of the points of the source set and a second distribution of (color) intensity of the points of the target set and comparing the first and second distributions of intensity.

B23. The computer-implemented method according to statement B22, comprising determining a contribution to the similarity score for each target set based on the comparison of the first distribution of intensity with the second distribution of intensity concerned.

B24. The computer-implemented method according to statement B22 or B23, wherein comparing the first and second distributions of intensity comprise determining a distance measure/similarity measure between the distributions.

B25. The computer-implemented method according to any of statements B16-B24, comprising determining a contribution to the similarity score for each target set based on the distance measure/similarity measure corresponding to the target set.

B26. The computer-implemented method according to any of statements B22-B25, wherein the first and second distributions of intensity are determined as histograms of the intensity of points in the set concerned.

B27. The computer-implemented method according to any of statements B22-B26, wherein the first and second distributions of intensity are distributions of RGB or CYMK colors of the points in the set concerned or distributions of LiDAR intensity of the points in the set concerned.

B28. The computer-implemented method according to any of statements B22-B27, wherein the first and second distributions of intensity are determined as histograms RGB or CYMK colors or LiDAR intensity of the points in the set concerned.

B29. The computer-implemented method according to any of statements B16-B28, wherein the distance measure/similarity measure comprise a Bhattacharyya distance.

B30. The computer-implemented method according to any of the preceding B statements, wherein comparing the source set with each of the plurality of target sets comprise determining a first distribution of (color) intensity of points in the source set and, for each target set: determining a second distribution of (color) intensity of points in the target set; computing a distance measure/similarity measure between the first and second distributions of intensity; and adding a contribution to the similarity score for the target set based on the computed divergence.

B31. The computer-implemented method according to statement B30, wherein the distance measure/similarity measure comprises a Bhattacharyya distance.

B32. The computer-implemented method according to statement B30 or B31, wherein the first and second distributions of intensity are determined as histograms of RGB or CYMK colors or LiDAR intensity of the points in the set concerned.

B33. The computer-implemented method according to any of statements B12-B32, wherein comparing the source set with each of the plurality of target sets comprise, for each target set, combining the first and second contributions to determine the similarity score for the target set.

B34. The computer-implemented method according to any of the preceding B statements, wherein determining the transformation matrix comprises determining the transformation matrix using an iterative closest point, ICP, algorithm.

B35. The computer-implemented method according to any of the preceding B statements, comprising, when a plurality of overlap cells are determined: performing the comparison process for each overlap cell (to determine a plurality of best matching target sets corresponding to a plurality of source sets, each source set corresponding to an overlap cell); determining a final target set of points comprising the points of at least one of said/the best matching target sets and determining a final source set of points comprising the points of said/the corresponding at least one source set (corresponding to the at least one best matching target set); and determining the transformation matrix between the points of the final source set and the points of the final target set.

B36. The computer-implemented method according to statement B35, wherein matching target sets with a similarity score above a threshold score or with the highest similarity score and determining the final target set of points as including the points of the at least one selected best matching target set.

B37. The computer-implemented method according to any of the preceding B statements, wherein the source 2D projection comprises points representative of the points of the source 3D point cloud and the target 2D projection comprises points representative of the points of the target 3D point cloud.

B38. The computer-implemented method according to any of the preceding B statements, wherein the source and target 3D point clouds comprise LiDAR scanning data.

B39. A computer-implemented method comprising: estimating a 3D (3-dimensional) overlap volume between a source 3D point cloud and a target 3D point cloud based on an overlapping region between source and target geographical areas, the source and target 3D point clouds representative of the source and target geographical areas, respectively; dividing the 3D overlap volume into a plurality of cells and determining at least one overlap cell which includes at least a first threshold number of points from the source 3D point cloud and at least a second threshold number of points from the target 3D point cloud (or determining at least one cell which includes at least a first threshold number of points from the source 3D point cloud and at least a second threshold number of points from the target 3D point cloud as at least one overlap cell); for each (said) overlap cell: determining a plurality of target sets of points comprising a first (target) set of points of the target 3D point cloud which are in the overlap cell and second and further (target) sets of points of the target 3D point cloud which are in cells neighboring/surrounding the overlap cell, respectively, determining a source set of points comprising points of the 3D source point cloud which are in the overlap cell, comparing the source set with each of the plurality of target sets to determine a plurality of similarity scores for the plurality of target sets, respectively, (each similarity score quantifying similarity between the source set and a said target set,) and based on the similarity scores, selecting a best matching target set; determining a final target set of points comprising the points of at least one of said/the best matching target sets and determining a final source set of points comprising the points of said/the corresponding at least one source set (corresponding to the at least one best matching target set); determining a transformation (matrix) between the points of the final source set and the points of the final target set or vice versa; and applying the transformation (matrix) (to the source 3D point cloud) to register the source 3D point cloud to the target 3D point cloud or vice versa.

B40. A computer program which, when run on a computer, causes the computer to carry out a method comprising: estimating a 3D (3-dimensional) overlap volume between a source 3D point cloud and a target 3D point cloud based on an overlapping region between source and target geographical areas, the source and target 3D point clouds representative of the source and target geographical areas, respectively; dividing the 3D overlap volume into a plurality of cells and determining at least one overlap cell which includes at least a first threshold number of points from the source 3D point cloud and at least a second threshold number of points from the target 3D point cloud (or determining at least one cell which includes at least a first threshold number of points from the source 3D point cloud and at least a second threshold number of points from the target 3D point cloud as at least one overlap cell); performing a comparison process for said (or a said) overlap cell, the comparison process (for said/the overlap cell) comprising: determining a plurality of target sets of points comprising a first (target) set of points of the target 3D point cloud which are in said/the overlap cell and second and further (target) sets of points of the target 3D point cloud which are in cells neighboring/surrounding said/the overlap cell, respectively, determining a source set of points comprising points of the 3D source point cloud which are in said/the overlap cell, comparing the source set with each of the plurality of target sets to determine a plurality of similarity scores for the plurality of target sets, respectively, (each similarity score quantifying similarity between the source set and a said target set,) and based on the similarity scores, selecting a best matching target set; determining a transformation (matrix) between the points of the source set and the points of the best matching target set or vice versa; and applying the transformation (matrix) (to the source 3D point cloud) to register the source 3D point cloud to the target 3D point cloud or vice versa.

B41. An information processing apparatus comprising a memory and a processor connected to the memory, wherein the processor is configured to: estimate a 3D (3-dimensional) overlap volume between a source 3D point cloud and a target 3D point cloud based on an overlapping region between source and target geographical areas, the source and target 3D point clouds representative of the source and target geographical areas, respectively; divide the 3D overlap volume into a plurality of cells and determine at least one overlap cell which includes at least a first threshold number of points from the source 3D point cloud and at least a second threshold number of points from the target 3D point cloud (or determining at least one cell which includes at least a first threshold number of points from the source 3D point cloud and at least a second threshold number of points from the target 3D point cloud as at least one overlap cell); perform a comparison process for said (or a said) overlap cell, the comparison process (for said/the overlap cell) comprising: determining a plurality of target sets of points comprising a first (target) set of points of the target 3D point cloud which are in said/the overlap cell and second and further (target) sets of points of the target 3D point cloud which are in cells neighboring/surrounding said/the overlap cell, respectively, determining a source set of points comprising points of the 3D source point cloud which are in said/the overlap cell, comparing the source set with each of the plurality of target sets to determine a plurality of similarity scores for the plurality of target sets, respectively, (each similarity score quantifying similarity between the source set and a said target set,) and based on the similarity scores, selecting a best matching target set; determine a transformation (matrix) between the points of the source set and the points of the best matching target set or vice versa; and apply the transformation (matrix) (to the source 3D point cloud) to register the source 3D point cloud to the target 3D point cloud or vice versa.

The invention claimed is:

1. A computer-implemented method comprising:

determining a 2D overlapping portion between a source 2D projection of a source 3D point cloud and a target 2D projection of a target 3D point cloud, the source and target 3D point clouds representative of source and target geographical areas, respectively, the 2D overlapping portion corresponding to an overlapping region between the source and target geographical areas;

dividing the 2D overlapping portion into a plurality of cells and determining at least one overlap cell which includes at least a first threshold number of points from the source 2D projection and at least a second threshold number of points from the target 2D projection;

performing a comparison process for said overlap cell, the comparison process comprising:

determining a plurality of target sets of points comprising a first target set of points of the target 3D point cloud falling within said overlap cell and second and further target sets of points of the target 3D point cloud falling within cells neighboring said overlap cell, respectively, determining a source set of points comprising points of the 3D source point cloud that fall within said overlap cell, comparing the source set with each of the plurality of target sets to determine a plurality of similarity scores for the plurality of target sets, respectively, and based on the similarity scores, selecting a best matching target set;

determining a transformation between the points of the source set and the points of the best matching target set or vice versa; and applying the transformation to register the source 3D point cloud to the target 3D point cloud or vice versa.

2. The computer-implemented method as claimed in claim 1, further comprising determining the overlapping region between the source and target geographical areas based on GPS data.

3. The computer-implemented method as claimed in claim 1, wherein the target sets for said overlap cell are determined as target sets of points of the target 3D point cloud falling within respective cells in a Moore neighborhood with said overlap cell as a central cell of the Moore neighborhood.

4. The computer-implemented method as claimed in claim 1, wherein comparing the source set with each of the plurality of target sets comprises determining a source convex hull of the points of the source set and determining a plurality of target convex hulls of the points of the plurality of target sets, respectively, and comparing the source convex hull with each target convex hull.

5. The computer-implemented method as claimed in claim 1, wherein comparing the source set with each of the plurality of target sets comprises, for each target set:

performing a first comparison between a shape of the points of the source set and a shape of the points of the target set to determine a first contribution to the similarity score for the target set; and/or performing a second comparison between intensities of the points of the source set and intensities of the points of the target set to determine a second contribution to the similarity score for the target set.

6. The computer-implemented method as claimed in claim 1, wherein comparing the source set with each of the plurality of target sets comprises performing a first and/or a second comparison process, wherein the first comparison process comprises determining a convex hull of the points of the source set and determining a first distribution of dihedral angles of the convex hull of the points of the source set and, for each target set:

determining a convex hull of the points of the target set;

determining a second distribution of dihedral angles of the convex hull of the points of the target set;

computing a divergence between the first and second distributions of dihedral angles; and adding a contribution to the similarity score for the target set based on the computed divergence, and wherein the second comparison process comprises determining a first distribution of intensity of points in the source set and, for each target set:

determining a second distribution of intensity of points in the target set;

computing a distance measure between the first and second distributions of intensity; and adding a contribution to the similarity score for the target set based on the computed divergence.

7. The computer-implemented method as claimed in claim 1, comprising, when a plurality of overlap cells are determined:

performing the comparison process for each overlap cell;

determining a final target set of points comprising the points of at least one of said best matching target sets and determining a final source set of points comprising the points of said corresponding at least one source set; and determining the transformation between the points of the final source set and the points of the final target set.

8. The computer-implemented method as claimed in claim 7, wherein determining a final target set of points comprises selecting at least one of the best matching target sets with a similarity score above a threshold score or with the highest similarity score and determining the final target set of points as including the points of the at least one selected best matching target set.

9. A computer program stored in a non-transitory computer-readable medium which, when run on a computer, causes the computer to carry out a method comprising:

determining a 2D overlapping portion between a source 2D projection of a source 3D point cloud and a target 2D projection of a target 3D point cloud, the source and target 3D point clouds representative of source and target geographical areas, respectively, the 2D overlapping portion corresponding to an overlapping region between the source and target geographical areas;

dividing the 2D overlapping portion into a plurality of cells and determining at least one overlap cell which includes at least a first threshold number of points from the source 2D projection and at least a second threshold number of points from the target 2D projection;

performing a comparison process for said overlap cell, the comparison process comprising:

determining a plurality of target sets of points comprising a first target set of points of the target 3D point cloud falling within said overlap cell and second and further target sets of points of the target 3D point cloud falling within cells neighboring said overlap cell, respectively, determining a source set of points comprising points of the 3D source point cloud that fall within said overlap cell, comparing the source set with each of the plurality of target sets to determine a plurality of similarity scores for the plurality of target sets, respectively, and based on the similarity scores, selecting a best matching target set;

determining a transformation between the points of the source set and the points of the best matching target set or vice versa; and applying the transformation to register the source 3D point cloud to the target 3D point cloud or vice versa.

10. An information processing apparatus comprising a memory and a processor connected to the memory, wherein the processor is configured to:

determine a 2D overlapping portion between a source 2D projection of a source 3D point cloud and a target 2D projection of a target 3D point cloud, the source and target 3D point clouds representative of source and target geographical areas, respectively, the 2D overlapping portion corresponding to an overlapping region between the source and target geographical areas;

divide the 2D overlapping portion into a plurality of cells and determine at least one overlap cell which includes at least a first threshold number of points from the source 2D projection and at least a second threshold number of points from the target 2D projection;

perform a comparison process for said overlap cell, the comparison process comprising:

determining a plurality of target sets of points comprising a first target set of points of the target 3D point cloud falling within said overlap cell and second and further target sets of points of the target 3D point cloud falling within cells neighboring said overlap cell, respectively, determining a source set of points comprising points of the 3D source point cloud that fall within said overlap cell, comparing the source set with each of the plurality of target sets to determine a plurality of similarity scores for the plurality of target sets, respectively, and based on the similarity scores, selecting a best matching target set;

determine a transformation between the points of the source set and the points of the best matching target set or vice versa; and apply the transformation to register the source 3D point cloud to the target 3D point cloud or vice versa.

11. A computer-implemented method comprising:

estimating a 3D overlap volume between a source 3D point cloud and a target 3D point cloud based on an overlapping region between source and target geographical areas, the source and target 3D point clouds representative of the source and target geographical areas, respectively;

dividing the 3D overlap volume into a plurality of cells and determining at least one overlap cell which includes at least a first threshold number of points from the source 3D point cloud and at least a second threshold number of points from the target 3D point cloud;

performing a comparison process for said overlap cell, the comparison process comprising:

determining a plurality of target sets of points comprising a first target set of points of the target 3D point cloud which are in said overlap cell and second and further target sets of points of the target 3D point cloud which are in cells neighboring said overlap cell, respectively, determining a source set of points comprising points of the 3D source point cloud which are in said overlap cell, comparing the source set with each of the plurality of target sets to determine a plurality of similarity scores for the plurality of target sets, respectively, and based on the similarity scores, selecting a best matching target set;

determining a transformation between the points of the source set and the points of the best matching target set or vice versa; and applying the transformation to register the source 3D point cloud to the target 3D point cloud or vice versa.

12. The computer-implemented method as claimed in claim 11, wherein estimating the 3D overlap volume comprises determining the 3D overlap volume defined in first and second dimensions by a 2D overlapping portion between a source 2D projection of the source 3D point cloud and a target 2D projection of the target 3D point cloud and in a third dimension by upper and lower bounds of the source and target 3D point clouds in the third dimension, the 2D overlapping portion corresponding to the overlapping region between the source and target geographical areas.

13. The computer-implemented method as claimed in claim 11, wherein the target sets for said overlap cell are determined as target sets of points of the target 3D point cloud which are in respective cells in a Moore neighborhood with said overlap cell as a central cell of the Moore neighborhood.

14. The computer-implemented method as claimed in claim 11, wherein comparing the source set with each of the plurality of target sets comprises determining a source convex hull of the points of the source set and determining a plurality of target convex hulls of the points of the plurality of target sets, respectively, and comparing the source convex hull with each target convex hull.

15. The computer-implemented method as claimed in claim 11, wherein comparing the source set with each of the plurality of target sets comprises, for each target set:

performing a first comparison between a shape of the points of the source set and a shape of the points of the target set to determine a first contribution to the similarity score for the target set; and/or performing a second comparison between intensities of the points of the source set and intensities of the points of the target set to determine a second contribution to the similarity score for the target set.

16. The computer-implemented method as claimed in claim 11, wherein comparing the source set with each of the plurality of target sets comprises performing a first and/or a second comparison process, wherein the first comparison process comprises determining a convex hull of the points of the source set and determining a first distribution of dihedral angles of the convex hull of the points of the source set and, for each target set:

determining a convex hull of the points of the target set;

determining a second distribution of dihedral angles of the convex hull of the points of the target set;

computing a divergence between the first and second distributions of dihedral angles; and adding a contribution to the similarity score for the target set based on the computed divergence, and wherein the second comparison process comprises determining a first distribution of intensity of points in the source set and, for each target set:

determining a second distribution of intensity of points in the target set;

computing a distance measure between the first and second distributions of intensity; and adding a contribution to the similarity score for the target set based on the computed divergence.

17. The computer-implemented method as claimed in claim 11, comprising, when a plurality of overlap cells are determined:

performing the comparison process for each overlap cell;

determining a final target set of points comprising the points of at least one of said best matching target sets and determining a final source set of points comprising the points of said corresponding at least one source set; and determining the transformation between the points of the final source set and the points of the final target set.

18. The computer-implemented method as claimed in claim 17, wherein determining a final target set of points comprises selecting at least one of the best matching target sets with a similarity score above a threshold score or with the highest similarity score and determining the final target set of points as including the points of the at least one selected best matching target set.

19. A computer program stored in a non-transitory computer-readable medium which, when run on a computer, causes the computer to carry out a method comprising:

estimating a 3D overlap volume between a source 3D point cloud and a target 3D point cloud based on an overlapping region between source and target geographical areas, the source and target 3D point clouds representative of the source and target geographical areas, respectively;

dividing the 3D overlap volume into a plurality of cells and determining at least one overlap cell which includes at least a first threshold number of points from the source 3D point cloud and at least a second threshold number of points from the target 3D point cloud;

performing a comparison process for said overlap cell, the comparison process comprising:

determining a plurality of target sets of points comprising a first target set of points of the target 3D point cloud which are in said overlap cell and second and further target sets of points of the target 3D point cloud which are in cells neighboring said overlap cell, respectively, determining a source set of points comprising points of the 3D source point cloud which are in said overlap cell, comparing the source set with each of the plurality of target sets to determine a plurality of similarity scores for the plurality of target sets, respectively, and based on the similarity scores, selecting a best matching target set;

determining a transformation between the points of the source set and the points of the best matching target set or vice versa; and applying the transformation to register the source 3D point cloud to the target 3D point cloud or vice versa.

20. An information processing apparatus comprising a memory and a processor connected to the memory, wherein the processor is configured to:

estimate a 3D overlap volume between a source 3D point cloud and a target 3D point cloud based on an overlapping region between source and target geographical areas, the source and target 3D point clouds representative of the source and target geographical areas, respectively;

divide the 3D overlap volume into a plurality of cells and determine at least one overlap cell which includes at least a first threshold number of points from the source 3D point cloud and at least a second threshold number of points from the target 3D point cloud;

perform a comparison process for said overlap cell, the comparison process comprising:

determining a plurality of target sets of points comprising a first target set of points of the target 3D point cloud which are in said overlap cell and second and further target sets of points of the target 3D point cloud which are in cells neighboring said overlap cell, respectively, determining a source set of points comprising points of the 3D source point cloud which are in said overlap cell, comparing the source set with each of the plurality of target sets to determine a plurality of similarity scores for the plurality of target sets, respectively, and based on the similarity scores, selecting a best matching target set;

determine a transformation between the points of the source set and the points of the best matching target set or vice versa; and apply the transformation to register the source 3D point cloud to the target 3D point cloud or vice versa.

* * * * *